US009121951B2

(12) United States Patent
Arimoto et al.

(10) Patent No.: US 9,121,951 B2
(45) Date of Patent: Sep. 1, 2015

(54) DEPOSITION SUBSTRATE AND SCINTILLATOR PANEL

(71) Applicant: Konica Minolta, Inc., Tokyo (JP)

(72) Inventors: Tadashi Arimoto, Tokyo (JP); Kiyoshi Hagiwara, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/180,824

(22) Filed: Feb. 14, 2014

(65) Prior Publication Data

US 2014/0239195 A1 Aug. 28, 2014

(30) Foreign Application Priority Data

Feb. 28, 2013 (JP) .................... 2013-38774

(51) Int. Cl.
*G01J 1/58* (2006.01)
*G01T 1/202* (2006.01)
*G01T 1/20* (2006.01)
*C09K 11/55* (2006.01)
*G21K 4/00* (2006.01)

(52) U.S. Cl.
CPC .............. *G01T 1/202* (2013.01); *C09K 11/55* (2013.01); *G01T 1/2002* (2013.01); *G21K 2004/06* (2013.01); *Y10T 428/249974* (2015.04); *Y10T 428/269* (2015.01)

(58) Field of Classification Search
CPC ....................................................... G21K 4/00
USPC ....................................................... 250/487.1
See application file for complete search history.

(56) References Cited

U.S. PATENT DOCUMENTS

| 4,940,901 | A | * | 7/1990 | Henry et al. ............. 250/370.09 |
| 6,579,606 | B1 | * | 6/2003 | Uchiya et al. ................. 428/323 |
| 2006/0065863 | A1 | * | 3/2006 | Takasu et al. ................. 250/581 |
| 2009/0135356 | A1 | * | 5/2009 | Ando ........................... 349/137 |

FOREIGN PATENT DOCUMENTS

| JP | 57-35855 | 2/1982 |
| JP | 62-025753 | 2/1987 |
| JP | 62-103635 | 5/1987 |
| JP | 1-240887 | 9/1989 |
| JP | 5-312961 | 11/1993 |
| JP | 6-331749 | 12/1994 |
| JP | 7-21560 A | 1/1995 |

(Continued)

OTHER PUBLICATIONS

John Rowlands, "Amorphous Semiconductor Usher in Digital X-ray Imaging", Physics Today, November issue, 24 (1997).

(Continued)

*Primary Examiner* — David Porta
*Assistant Examiner* — Hugh H Maupin
(74) *Attorney, Agent, or Firm* — Lucas & Mercanti, LLP

(57) ABSTRACT

An object of the invention is to provide a scintillator panel which exhibits excellent cuttability and can be cut without the occurrence of problems such as the separation of a scintillator layer and which can give radiographic images such as X-ray images with excellent sensitivity and sharpness. The scintillator panel of the invention includes a reflective layer and a scintillator layer formed by deposition on a support, and the reflective layer includes light-scattering particles and a specific binder resin and has a specific thickness.

23 Claims, 6 Drawing Sheets

(56) References Cited

FOREIGN PATENT DOCUMENTS

| | | |
|---|---|---|
| JP | 7-21560 B2 | 3/1995 |
| JP | 09-050093 | 2/1997 |
| JP | 52-035625 | 3/1997 |
| JP | 2000-356679 | 12/2000 |
| JP | 2001-59899 | 3/2001 |
| JP | 2002-116258 | 4/2002 |
| JP | 3566926 | 6/2004 |
| JP | 2006-335887 | 12/2006 |
| JP | 2008-209124 | 9/2008 |

OTHER PUBLICATIONS

L. E. Antonuk, "Development of a High-Resolution Active-Matrix Flat-Panel Imager with Enhanced Fill Factor", SPIE, 32, 2 (1997).

* cited by examiner

DEPOSITION SUBSTRATE AND SCINTILLATOR PANEL

CROSS REFERENCE TO RELATED APPLICATION

This U.S. patent application claims priority under the Paris Convention of Japanese Patent Application No. 2013-38774 filed on Feb. 28, 2013, the entirety of which is incorporated herein by reference.

BACKGROUND OF THE INVENTION

1. Field of the Invention

The present invention relates to deposition substrates and to scintillator panels used in the formation of radiographic images of subjects.

2. Description of the Related Art

Radiographic images such as X-ray images have been widely used in medical diagnosis of disease conditions. In particular, radiographic images based on intensifying screen-film combinations have undergone enhancements in terms of sensitivity and image quality during a long history and consequently remain in use in the medical field worldwide as the imaging system with high reliability and excellent cost performance. However, this image information is analogue and thus cannot be processed freely or transmitted instantaneously in contrast to digital image information which has been developed currently.

Recently, digital radiographic image detectors such as computed radiography (CR) systems and flat panel detectors (FPDs) have come in use. These radiographic image detectors directly give digital radiographic images and allow the images to be directly displayed on displays such as cathode ray tube panels and liquid crystal panels. Thus, there is no need for the images to be created on photographic films. Consequently, the digital X-ray image detectors have decreased a need for the image formation by silver halide photography and have significantly enhanced diagnostic convenience at hospitals and clinics.

The computed radiography (CR) is one of the digital X-ray image techniques currently used in medical practice. However, CR X-ray images are less sharp and are insufficient in spatial resolution as compared to screen film system images such as by silver halide photography, and the level of their image quality compares unfavorably to the quality level of screen film system images. Thus, new digital X-ray image techniques, for example, flat panel detectors (FPDs) involving a thin film transistor (TFT) have been developed (see, for example, Non Patent Literatures 1 and 2).

In principle, a FPD converts X-rays into visible light. For this purpose, a scintillator panel is used which has a scintillator layer made of an X-ray phosphor that, when illuminated with X-rays, convert the radiations into visible light that is emitted. In X-ray photography using a low-dose X-ray source, it is necessary to use a scintillator panel with high luminous efficiency (X-ray to visible light conversion) in order to enhance the ratio (the SN ratio) of signal to noise detected from the scintillator panel. In general, the luminous efficiency of scintillator panels is determined by the thickness of the scintillator layer (the phosphor layer) and the X-ray absorption coefficient of the phosphor. The light produced in the phosphor layer upon illumination with X-rays is scattered more markedly in the scintillator layer with increasing thickness of the phosphor layer, and consequently the sharpness of X-ray images obtained via the scintillator panel is lowered. Thus, setting of the sharpness required for the quality of X-ray images automatically determines the critical thickness of the phosphor layer in the scintillator panel.

On the other hand, some kinds of phosphors permit the critical thickness of phosphor layers in scintillator panels to be increased. Cesium iodide (CsI) is a phosphor that has a relatively high X-rays to visible light conversion ratio and is easily deposited to form a columnar phosphor crystal layer which can suppress the scattering of light in the phosphor crystals (namely, in the scintillator layer) by light guide effects. Thus, the thickness of the phosphor layer can be increased corresponding to the amount of suppressed scattering.

Because the luminous efficiency obtained with CsI alone is low, however, an approach to increasing the visible light conversion efficiency of the scintillator layers is generally adopted. For example, (1) CsI crystals and a sodium compound activator, (2) CsI crystals and a thallium compound activator, or (3) CsI crystals and an indium compound activator are deposited onto substrates to form scintillator layers, and the scintillator layers are annealed in the subsequent step.

Other approaches which have been proposed to increase the optical output of scintillator panels include a method in which scintillator layers are formed on reflective substrates (see, for example, Patent Literature 1), a method in which reflective layers are provided on substrates by depositing metal films (see, for example, Patent Literature 2), and a method in which reflective thin metal films are provided on substrates and coated with transparent organic films, and scintillator layers are formed on the transparent organic films (see, for example, Patent Literature 3). Although scintillator panels obtained by these methods achieve an increase in optical output, the light produced in the scintillator layer is scattered at the interface between the reflective layer and the scintillator layer, with the result that the X-ray image data obtained via the scintillator panels are disturbed and the sharpness of the obtainable X-ray images is markedly deteriorated.

Meanwhile, methods are proposed in which X-ray image detectors are manufactured by arranging scintillator panels on the surface of planar light-receiving elements (see, for example, Patent Literatures 4 and 5). However, the productivity of such detectors is low because of the need that the scintillator panels have to be produced in different sizes in accordance with various sizes of the planar light-receiving elements. Further, such an approach does not solve the aforementioned problem that the sharpness of X-ray images is deteriorated by the scattering of light at the interface between the reflective layer and the scintillator layer.

In the conventional production of scintillator panels by a gas-phase method, it is a general practice to form a scintillator layer on a rigid substrate made of such a material as aluminum or amorphous carbon, and cover the entire surface of the scintillator with a protective film (see, for example, Patent Literature 6). However, such scintillator panels having a scintillator layer on an inflexible and rigid substrate cause a difficulty in obtaining a uniform contact between the scintillator panel and a planar light-receiving element when they are bonded to each other. In detail, such a scintillator panel has irregularities ascribed to the unevenness of the substrate itself as well as to different heights of the columnar phosphor crystals in the scintillator layer, and the inflexible substrate significantly reflects the influence of such irregularities (a flexible substrate may cancel the irregularities by deformation) to make it difficult for the scintillator panel to be tightly and uniformly attached to a planar light-receiving element. To solve this problem, methods are proposed in which a spacer is used at the plane of contact between the scintillator panel and a planar light-receiving element (see, for example, Patent Literatures 4 and 5). However, this approach, which prioritizes the solution of problematic attachment between the scintillator panel and a planar light-receiving element over productivity, has a problem in that because the scintillator panel and the planar light-receiving element are spaced apart by a gap, the light produced in the scintillator layer of the scintillator panel is scattered in the gap to inevitably deteriorate the sharpness of the obtainable X-ray images. This problem has become more serious with the recent enlargement of flat panel detectors.

In order to solve the problems of loose attachment between scintillator panels and planar light-receiving elements as well as the problems associated with the use of spacers, methods have been generally adopted in which a scintillator layer is directly formed on an imaging element by deposition or in which a less sharp but flexible material such as a medical intensifying screen is used instead of a scintillator panel. Further, a method has been adopted in which a flexible protective layer made of such a material as a polyparaxylylene is used to protect layers such as scintillator layers in scintillator panels (see, for example, Patent Literature 7).

However, the substrates used in the above method are rigid materials such as aluminum and amorphous carbon. Even if the protective layer is formed with a thickness of about 10 μm on the scintillator layer or the substrate, the surface of the protective layer will show irregularities ascribed to the unevenness of the substrate itself as well as to different heights of the columnar phosphor crystals in the scintillator layer. Thus, even the adoption of such protective layers with the above thickness does not eliminate the influences of the irregularities on the substrates or the scintillator layers, and it remains difficult to achieve a uniform and close contact between the surface of the scintillator panel and the surface of a planar light-receiving element. On the other hand, increasing the thickness of the flexible protective layer increases the gap between the scintillator panel and a planar light-receiving element, resulting in a deterioration of the sharpness of the obtainable X-ray images.

Under such circumstances, there has been a demand for the development of radiographic flat panel detectors that have excellent luminous efficiency of scintillator panels and have small deteriorations in the sharpness of X-ray images due to factors such as the size of the gap between the scintillator panel and a planar light-receiving element.

Patent Literature 8 discloses a scintillator panel which includes a reflective layer on a substrate and a scintillator layer formed on the top by deposition, the reflective layer including a white pigment and a binder resin. Patent Literature 8 also discloses that because the reflective layer is formed of a white pigment and a binder resin, the scintillator panel exhibits high light-emitting efficiency and consequently sharp X-ray images are obtained. This scintillator panel can solve the aforementioned problem. That is, even when this scintillator panel is used in combination with a planar light-receiving element, the sharpness of X-ray images is negligibly decreased by factors such as the scattering of the emitted light at the interface between the scintillator panel and the planar light-receiving element.

However, the scintillator panels disclosed in Patent Literature 8 are still rife with possibilities for improvements such as in terms of the prevention of the separation of the scintillator layers during the cutting of the scintillator panels.

CITATION LIST

Patent Literature

[Patent Literature 1] JP-B-H07-21560
[Patent Literature 2] JP-A-H01-240887
[Patent Literature 3] JP-A-2000-356679
[Patent Literature 4] JP-A-H05-312961
[Patent Literature 5] JP-A-H06-331749
[Patent Literature 6] Japanese Patent No. 3566926
[Patent Literature 7] JP-A-2002-116258
[Patent Literature 8] JP-A-2008-209124

Non Patent Literature

[Non Patent Literature 1] John Rowlands, "Amorphous Semiconductor Usher in Digital X-ray Imaging", Physics Today, November issue, 24 (1997)
[Non Patent Literature 2] L. E. Antonuk, "Development of a High-Resolution Active-Matrix Flat-Panel Imager with Enhanced Fill Factor", SPIE, 32, 2 (1997)

SUMMARY OF THE INVENTION

The present invention is aimed at solving the above problems. In more detail, an object of the invention is to provide a scintillator panel which exhibits excellent cuttability and can be cut without the occurrence of problems such as the separation of a scintillator layer, and which can give radiographic images such as X-ray images with excellent sensitivity and sharpness. Another object of the invention is to provide a deposition substrate that allows for the manufacturing of such scintillator panels, exhibits excellent cuttability and is free from problems such as the separation of a reflective layer even when subjected to a cutting treatment.

The present inventors carried out extensive studies in order to achieve the above objects. As a result, the present inventors have found that a deposition substrate which includes a support and a reflective layer disposed on the support wherein the reflective layer includes light-scattering particles and a binder resin with a specific glass transition temperature (Tg) and has a specific film thickness exhibits excellent cuttability and realizes a scintillator panel capable of giving radiographic images such as X-ray images with excellent sensitivity and sharpness as well as capable of excellent cuttability.

In more detail, the present inventors have found the following.

It has been found that the binder resin having a specific Tg in the deposition substrate exhibits excellent adhesion with respect to the support and excellently follows deformation experienced during cutting. As a result, the deposition substrate and a scintillator panel including the deposition substrate do not suffer problems such as the separation of the reflective layer even when subjected to cutting, and the scintillator panel is free from problems such as the separation of a scintillator layer even when subjected to cutting.

It has been further found that the specific thickness of the reflective layer in the deposition substrate ensures that the reflective layer will not become separated from the support because of the thickness being so small that the reflective layer cannot withstand the impact applied during cutting as well as ensures that cracks will not be generated during film production because of the thickness being so large and accordingly there will occur no abnormal growth of phosphor crystals during deposition, thus resulting in the realization of excellent sharpness of radiographic images obtained via a scintillator panel including the deposition substrate.

Furthermore, it has been found that the sharpness of radiographic images obtained via a scintillator panel including the deposition substrate is further improved when the volatile content in the reflective layer in the deposition substrate is in a specific range.

With respect to a scintillator panel in which a scintillator layer is disposed on the surface of the reflective layer (the surface of the reflective layer opposite to the support side) of the deposition substrate, the present inventors have also found that the heights of crystals forming the scintillator layer can be aligned without any deteriorations in the characteristics of the crystals by the application of a specific pressure to the scintillator panel at a temperature not less than the Tg of the binder resin, thus further enhancing the sharpness of radiographic images obtained via the scintillator panel.

To solve the aforementioned problems, a deposition substrate according to the present invention includes a support and a reflective layer disposed on the support, the reflective layer including light-scattering particles and a binder resin with a glass transition temperature of −100° C. to 60° C., the thickness of the reflective layer being 5 to 300 μm.

In the deposition substrate of the invention, it is preferable that the light-scattering particles include at least one selected from alumina, yttrium oxide, zirconium oxide, titanium dioxide, barium sulfate, silica, zinc oxide, calcium carbonate, glasses and resins.

In the deposition substrate of the invention, it is preferable that the light-scattering particles include at least one type of particles selected from hollow particles having a hollow portion within the particle, multi-hollow particles having a number of hollow portions within the particle, and porous particles.

In the deposition substrate of the invention, it is preferable that the light-scattering particles include at least titanium dioxide.

In the deposition substrate of the invention, it is preferable that the volatile content in the reflective layer be not more than 0.5 mg/m$^2$.

In the deposition substrate of the invention, it is preferable that the support include a resin as a main component and the reflective layer be disposed on the support.

In the deposition substrate of the invention, it is preferable that the resin be polyimide.

Preferably, the deposition substrate of the invention further includes a light-absorbing layer on the side opposite to the deposition surface (hereinafter, also referred to as the "scintillator layer formation scheduled surface") of the reflective layer.

To solve the aforementioned problems, a deposition substrate production method according to the present invention includes forming a reflective layer including a binder resin on a support, and cutting the deposition substrate after the formation of the reflective layer.

In the deposition substrate production method of the invention, it is preferable that the glass transition temperature of the binder resin be −100 to 60° C. and the thickness of the reflective layer be 5 to 300 μm.

To solve the aforementioned problems, a scintillator panel according to the present invention includes a support, a reflective layer disposed on the support, and a scintillator layer formed on the reflective layer by deposition, the reflective layer including light-scattering particles and a binder resin with a glass transition temperature of −100° C. to 60° C., the thickness of the reflective layer being 5 to 300 μm.

The scintillator panel of the invention is preferably obtained by forming a scintillator layer by deposition on a scintillator layer formation scheduled surface of the deposition substrate.

In the scintillator panel of the invention, it is preferable that the light-scattering particles include at least one selected from alumina, yttrium oxide, zirconium oxide, titanium dioxide, barium sulfate, silica, zinc oxide, calcium carbonate, glasses and resins.

In the scintillator panel of the invention, it is preferable that the light-scattering particles include at least one type of particles selected from hollow particles having a hollow portion within the particle, multi-hollow particles having a number of hollow portions within the particle, and porous particles.

In the scintillator panel of the invention, it is preferable that the light-scattering particles include at least titanium dioxide.

In the scintillator panel of the invention, it is preferable that the support include a resin as a main component and the reflective layer be disposed on the support.

In the scintillator panel of the invention, it is preferable that the resin be polyimide.

Preferably, the scintillator panel of the invention further includes a light-absorbing layer on the side opposite to the surface of the reflective layer on which the scintillator layer is disposed.

In the scintillator panel of the invention, it is preferable that the scintillator layer have a columnar crystal structure formed by depositing raw materials including cesium iodide and one or more activators including at least thallium.

In the scintillator panel of the invention, it is preferable that the surface of the scintillator layer be covered with a protective film.

In the scintillator panel of the invention, it is preferable that the protective film be a polyparaxylylene film.

In the scintillator panel of the invention, it is preferable that the scintillator layer include columnar crystals grown from an interface between the reflective layer and the scintillator layer.

The scintillator panel of the invention is preferably supported on a support plate having higher rigidity than the deposition substrate.

To solve the aforementioned problems, a scintillator panel manufacturing method according to the present invention includes forming a reflective layer including a binder resin on a support, and forming a scintillator layer on the reflective layer by deposition, wherein the heights of columnar crystals forming the scintillator layer are aligned by applying a pressure of 1,000 to 10,000,000 Pa to the surface of the scintillator panel at a temperature not less than the glass transition temperature of the binder resin.

In the scintillator panel manufacturing method of the invention, it is preferable that the glass transition temperature of the binder resin be −100 to 60° C. and the thickness of the reflective layer be 5 to 300 μm.

The deposition substrates according to the present invention have excellent cuttability and may be cut without the separation of the reflective layer. Further, the inventive deposition substrates realize scintillator panels which exhibit excellent cuttability and are free from the separation of the scintillator layer during cutting and which can give radiographic images such as X-ray images with excellent sensitivity and sharpness.

The scintillator panels according to the present invention are suppressed from the separation of the scintillator layer during cutting and can give radiographic images such as X-ray images with excellent sensitivity and sharpness.

According to the scintillator panel manufacturing method of the invention, the heights of columnar crystals are aligned under specific conditions so as to allow for the manufacturing of scintillator panels realizing further enhanced sharpness of the obtainable radiographic images.

DESCRIPTION OF THE PREFERRED EMBODIMENTS

Figure 1:
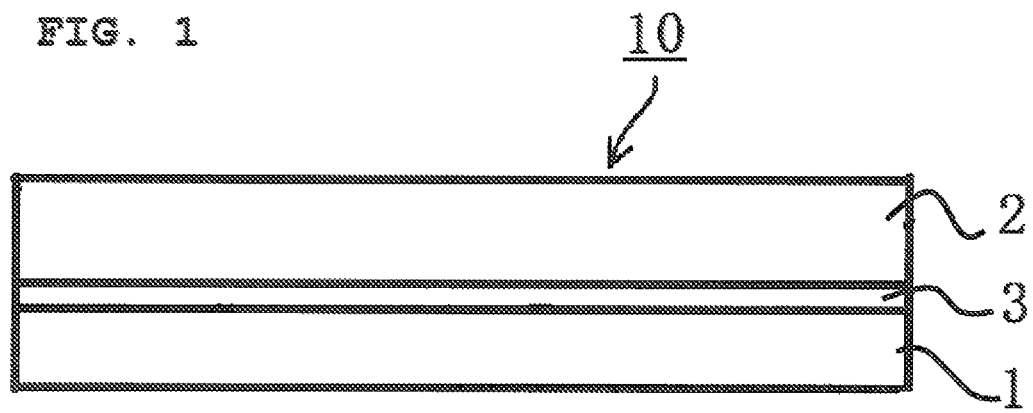
FIG. 1 is a schematic sectional view illustrating a configuration of a radiographic scintillator panel 10 as an example of scintillator panels.

Hereinbelow, deposition substrates and scintillator panels according to the present invention will be described in detail. The scope of the invention is not limited to the embodiments described below, and various modifications are possible without departing from the scope of the invention.

The deposition substrates of the invention include a support and a specific reflective layer disposed on the support.

The scintillator panels of the invention include the support, the reflective layer, and a scintillator layer formed by deposition.

Hereinbelow, configurations of the invention will be described.

The term "phosphors (scintillators)" in the invention refers to fluorescent materials that absorb energy of incident invisible radiations (the wavelengths are usually 10 nm or less) such as X-rays and γ-rays and emit electromagnetic waves having wavelengths of 300 nm to 800 nm, namely, electromagnetic waves (lights) mainly in the visible light region from ultraviolet light to infrared light.

1. Deposition Substrates

A deposition substrate of the invention includes a support and a reflective layer disposed on the support. The reflective layer includes light-scattering particles and a binder resin with a glass transition temperature of −100° C. to 60° C. The thickness of the reflective layer is 5 to 300 μm.

The glass transition temperature of the binder resin and the thickness of the reflective layer which are in the above ranges ensure that the deposition substrate exhibits excellent cuttability and the reflective layer is not separated during cutting.

From the viewpoints of handling properties and cuttability, the thickness of the entirety of the deposition substrate is preferably 10 to 1,000 μm.

1-1. Reflective Layers

In the deposition substrates of the invention, a reflective layer is disposed on a support and includes light-scattering particles and a specific binder resin.

In the deposition substrates of the invention, the support and the reflective layer may be each comprised of a single layer, or two or more layers.

In order for the deposition substrates and scintillator panels produced therewith to achieve excellent cuttability as well as from the viewpoint of the adhesion with respect to the surface of a light-receiving element used for radiography in combination with the scintillator panel, the thickness of the reflective layer is usually 5 to 300 μm, preferably 15 to 150 μm, and more preferably 30 to 100 μm.

If the thickness of the reflective layer is less than 5 μm, separation tends to occur at the interface between the support and the reflective layer because of the failure of the reflective layer to follow deformation experienced during cutting. In a scintillator panel in which a scintillator layer is disposed on the scintillator layer formation scheduled surface of such an excessively thin reflective layer in the deposition substrate, the reflective layer similarly fails to follow deformation during cutting and tends to be separated at the interface between the support and the reflective layer or at the interface between the scintillator layer and the reflective layer. If the thickness of the reflective layer exceeds 300 μm, the deposition substrate tends to exhibit large warpage due to the residual stress after film production. Depositing a scintillator layer onto such a deposition substrate tends to result in the occurrence of cracks in the scintillator layer and consequent deteriorations in image quality (in particular, sharpness) of the obtainable radiographic images.

In order to ensure that a phosphor having excellent crystallinity (crystalline order) will be formed on the surface of the reflective layer in the deposition substrate (the surface of the reflective layer opposite to the surface in contact with the support), the volatile content in the reflective layer is preferably not more than 0.7 mg/m$^2$, and more preferably not more than 0.5 mg/m$^2$. (The measurement method will be described later.)

Examples of the volatile components include residual solvents and water.

The reflective layer is preferably disposed on a support including a resin as a main component. According to this configuration, the deposition substrate advantageously exhibits excellent cuttability. The resin will be described in detail later. From the viewpoint of cuttability of the deposition substrate and a scintillator panel including the deposition substrate, it is particularly preferable that the reflective layer be disposed on a support including polyimide as a main component.

As used herein, the term "main component" indicates that the component represents 50 to 100 wt % of the total of component(s) constituting the support taken as 100 wt %.

In the deposition substrates of the invention, the surface of the reflective layer opposite to the surface in contact with the support is defined as the "scintillator layer formation scheduled surface.

In the deposition substrate of the invention, the reflective layer disposed on the support includes a binder resin with a specific Tg and has a specific thickness. With this configuration, the deposition substrate can realize a device such as a scintillator panel exhibiting excellent cuttability and capable of giving excellently sharp radiographic images.

The reflective layer may contain additives described later such as fluorescent whitening agents, coloring materials for controlling the reflectance (such as carbon black and titanium black), and UV absorbers.

From the viewpoint of transmission of radiations such as X-rays, the reflective layer in the deposition substrate of the invention may have voids, such as those formed by a method described later.

In this case, the void volume in the reflective layer (the proportion of the volume of the voids to the volume of the reflective layer) is preferably 54 to 30% from the above viewpoint. The void volume may be easily calculated based on the difference between the theoretical density (without voids) and the actual density of the reflective layer.

From viewpoints such as the brightness and the sharpness of the obtainable radiographic images, the reflectance of the reflective layer in the deposition substrate of the invention is preferably 5% to 98%.

Herein, the reflectance of the reflective layer is calculated from the spectral reflectivity in the 400 to 700 nm wavelength band with spectrocolorimeter SE-2000 (manufactured by NIPPON DENSHOKU INDUSTRIES CO., LTD.) in accordance with JIS Z-8722. The reflectance is a value at 550 nm wavelength in the absence of any indication of reflection wavelength.

1-1-1. Light-Scattering Particles

The light-scattering particles present in the reflective layer in the inventive deposition substrate serve to prevent the light produced in the scintillator layer from being diffused in the reflective layer as well as to effectively return the light which has reached the reflective layer into the columnar crystals of the scintillator layer.

Such light-scattering particles may be commercial products or may be produced by known methods as will be described later.

The light-scattering particles are not particularly limited as long as the particle material has a different refractive index from the binder resin which in combination therewith constitutes the reflective layer. Examples of such materials include alumina, yttrium oxide, zirconium oxide, titanium dioxide, barium sulfate, silica, zinc oxide, calcium carbonate, glasses and resins. These materials may be used singly, or two or more may be used as a mixture. (The mixture may include two or more materials belonging to different categories such as a glass and a resin; two or more materials belonging to the same category such as an acrylic resin and a polyester resin; or one or more materials belonging to a category and one or more materials belonging to another category such as a glass, an acrylic resin and a polyester resin.)

Of the above materials, for example, glass beads and resin beads, in particular, glass beads are preferable because the refractive index can be set to a desired value more freely and thus optical diffusion characteristics can be controlled more easily than metal oxides.

Glass beads having a higher refractive index are more preferable. Examples thereof include BK7 (n (relative refractive index, the same applies hereinafter)=about 1.5); LaSFN9 (n=about 1.9); SF11 (n=about 1.8); F2 (n=about 1.6); BaK1 (n=about 1.6); barium titanate (n=about 1.9); high refractive index blue glass (n=about 1.6 to 1.7); $TiO_2$—BaO (n=about 1.9 to 2.2); borosilicate (n=about 1.6); and chalcogenide glass (n=about 2 or more). Examples of the resin beads include acrylic particles, polyester resin particles, polyolefin particles and silicone particles, with specific suitable examples including CHEMISNOW (registered trademark) (manufactured by Soken Chemical & Engineering Co., Ltd.), Silicone Resins KR Series (manufactured by Shin-Etsu Chemical Co., Ltd.), and TECHPOLYMER (registered trademark) (manufactured by SEKISUI PLASTICS CO., LTD.).

White pigments such as titanium dioxide ($TiO_2$) have high opacifying properties and a high refractive index, and can easily scatter the light emitted from the scintillator by reflecting and refracting the light. Thus, the use of such pigments allows for marked improvements in the sensitivity of devices such as radiographic image conversion panels including scintillator panels in which scintillator layers are disposed on the inventive deposition substrates.

The light-scattering particles are particularly preferably titanium dioxide ($TiO_2$) in view of the facts that this material is easily available and has a high refractive index.

When titanium dioxide is used as the light-scattering particles, the titanium dioxide may be one which has been surface treated with inorganic compounds or organic compounds in order to improve dispersibility and workability. For example, the surface-treated titanium dioxide and the surface treatment methods are disclosed in JP-A-S52-35625, JP-A-S55-10865, JP-A-S57-35855, JP-A-S62-25753, JP-A-S62-103635 and JP-A-H09-050093. For the surface treatments, inorganic compounds such as aluminum oxide hydrate, hydrous zinc oxide and silicon dioxide, and organic compounds such as dihydric to tetrahydric alcohols, trimethylolamine, titanate coupling agents and silane coupling agents may be preferably used as surface-treatment agents. The amounts of the surface-treatment agents may be determined appropriately in accordance with the purposes as described in the above patent literatures.

The crystal structure of the titanium dioxide may be any of rutile, brookite and anatase forms. However, the rutile form is particularly preferable because its refractive index has a high ratio to that of resins to realize high brightness as well as from the viewpoint of the reflectance with respect to visible light.

Specific examples of titanium oxides include those produced by a hydrochloric acid process such as CR-50, CR-50-2, CR-57, CR-80, CR-90, CR-93, CR-95, CR-97, CR-60-2, CR-63, CR-67, CR-58, CR-58-2 and CP-85; and those produced by a sulfuric acid process such as R-820, R-830, R-930, R-550, R-630, R-680, R-670, R-580, R-780, R-780-2, R-850, R-855, A-100, A-220 and W-10 (product names, manufactured by ISHIHARA SANGYO KAISHA, LTD.).

From the viewpoint of reflectance, the area average particle diameter of the titanium oxide is preferably 0.1 to 10.0 μm, more preferably 0.1 to 5.0 μm, still more preferably 0.2 to 3.0 μm, and particularly preferably 0.2 to 0.3 μm. In order to improve the affinity and dispersibility for polymers as well as to suppress a degradation of polymers, the titanium oxide is particularly preferably one which has been surface treated with oxides of metals such as Al, Si, Zr and Zn.

The use of titanium oxide as the light-scattering particles tends to cause a decrease in the reflectance to light with wavelengths of 400 nm or less and also a degradation of the binder due to the photocatalytic action of titanium oxide. In view of these facts, it is preferable to use the titanium oxide in combination with at least one kind of light-scattering particles selected from barium sulfate, alumina, yttrium oxide and zirconium oxide which have a high reflectance even to light with wavelengths of at least 400 nm or less. Barium sulfate is more preferable because its reflectance in the wavelengths of 400 nm or less is particularly high. For the same reason, the mass ratio of barium sulfate to titanium dioxide is preferably 95:5 to 5:95, more preferably 20:80 to 5:95, and particularly preferably 20:80 to 80:20.

Further, it is preferable that the light-scattering particles include at least one selected from solid particles and void particles.

The void particles are not particularly limited as long as the particles have voids. Examples thereof include single-hollow particles having one hollow portion within the particle, multi-hollow particles having a number of hollow portions within the particle, and porous particles. These particles may be selected appropriately in accordance with the purpose.

Of the void particles, single-hollow particles and multi-hollow particles are preferable because they are free from the risk that the voids will be filled with the binder resin.

Here, the term "void particles" refers to particles having voids such as hollow portions and pores.

The term "hollow portions" refers to holes (air layers) in the inside of particles.

Due to the difference in refractive index between the holes (the air layers) and the shells (such as resin layers), the hollow particles can add optical reflection and diffusion characteristics to the reflective layer which cannot be obtained with solid particles.

The term "multi-hollow particles" refers to particles having a plurality of such holes in the inside of particles. The term "porous particles" refers to particles having pores in the particle. The term "pores" refers to portions that are inwardly curved or recessed from the surface toward the inside of the particle. Examples of the shapes of the pores include cavities, and needle-like shapes or curved shapes which are tapered or choked toward the inside or the core of the particles. The pores may be present across the particles. The sizes and the volumes of the pores may be variable and are not particularly limited.

The materials of the void particles are not particularly limited and may be selected appropriately in accordance with the purpose. Examples thereof include the aforementioned materials. In particular, suitable examples include thermoplastic resins such as styrene/acryl copolymers.

The void particles may be appropriately produced or are available in the market. Examples of the commercially available products include ROPAQUE HP1055 and ROPAQUE HP433J (manufactured by ZEON CORPORATION), and SX866 (manufactured by JSR Corporation).

Suitable examples of the multi-hollow particles include Sylosphere (registered trademark) and Sylophobic (registered trademark) manufactured by FUJI SILYSIA CHEMICAL LTD.

Of the void particles, single-hollow particles are particularly preferable in terms of void content.

When the void particles are used as the light-scattering particles, the light-scattering particles may be a collection of a single form of the above particles or may include two or more kinds of void particles. The void particles may be used in combination with solid particles.

The void particles may be advantageously used in combination with white pigments such as titanium dioxide, alumina, yttrium oxide, zirconium oxide and barium sulfate. This combined use prevents deteriorations in scintillator characteristics due to the white pigments adsorbing water ($H_2O$) and carbon dioxide ($CO_2$) to their surface and releasing them when exposed to heat or X-ray energy. That is, the combined use of the void particles and the white pigments suppresses the release of impurity gases such as water ($H_2O$) and carbon dioxide ($CO_2$) from the white pigments and thus prevents deteriorations in scintillator characteristics.

Alternatively, deteriorations in scintillator characteristics due to the detachment of water ($H_2O$) and carbon dioxide ($CO_2$) from the surface of white pigments may be effectively prevented by forming a large number of bubbles in the reflective layer including a white pigment and a binder resin. According to this method, the white pigment and the bubbles having a large difference in refractive index are placed in contact with each other in the reflective layer, and the reflectance of the reflective layer is improved by this increased difference in refractive index between the materials constituting the reflective layer. Details are described in the section of "Deposition substrate production methods".

From viewpoints such as the reflectance of the reflective layer, the occurrence of cracks on the surface of the reflective layer, and the stability of a coating liquid prepared for the formation of the reflective layer (hereinafter, also referred to as "reflective coating liquid", the same applies to coating liquids for other purposes), the area average particle diameter of the light-scattering particles is preferably 0.1 μm to 10.0 μm, and more preferably 0.1 μm to 5.0 μm. This area average particle diameter of the light-scattering particles ensures that optical scattering occurs efficiently in the reflective layer to lower the transparency and increase the reflectance, as well as that the reflective coating liquid exhibits improved stability over time and the occurrence of cracks in the dry reflective layer is avoided.

From the viewpoint of the dispersibility of the light-scattering particles in the reflective layer, the grain size distribution of the light-scattering particles is preferably in the range of 0.05 μm to 10.0 μm.

The volume fraction of the light-scattering particles is preferably 3 to 70 vol %, and more preferably 10 to 50 vol % in 100 vol % of the total volume of the components constituting the reflective layer. This fraction of the light-scattering particles in the reflective layer ensures not only that the reflectance of the reflective layer as well as the sensitivity of a scintillator panel having a scintillator layer on the deposition substrate are improved, but also that the adhesion with respect to the support or the phosphor layer is enhanced to suppress the separation of the reflective layer during cutting.

When the content of the light-scattering particles in the reflective layer is not more than 70 vol %, the reflective layer can follow deformation experienced during cutting and is thus not separated at the interface between the support and the reflective layer. Further, the above volume fraction is also advantageous in that the reflective layer can similarly follow deformation experienced during cutting of a scintillator panel in which a scintillator layer is disposed on the scintillator layer formation scheduled surface of the reflective layer in the deposition substrate, and consequently no separation occurs at the interface between the support and the reflective layer or at the interface between the scintillator layer and the reflective layer.

Further, it is preferable that the reflective layer in the inventive deposition substrate contain voids in a proportion of 5 to 30 vol %.

1-1-2. Binder Resins

The binder resins are not particularly limited as long as the objects of the invention are not deteriorated. The binder resins may be appropriately purchased or produced.

From the viewpoint of the cuttability of the deposition substrate, the glass transition temperature (Tg) of the binder resin measured by the method specified in JIS K 7121-1987 is −100° C. to 60° C., preferably −50° C. to 50° C., and more preferably −20° C. to 40° C.

If the glass transition temperature (Tg) of the binder resin is below −100° C., it tends to be that the surface of the reflective layer comes to exhibit high tackiness and easily collects foreign substances during production, thus increasing the occurrence of image defects in radiographic images obtained via a scintillator panel in which a scintillator layer is disposed on the scintillator layer formation scheduled surface of the deposition substrate. Further, such a reflective layer tends to fail to withstand the heat (usually 150° C. or more) applied thereto during the deposition of a scintillator layer on the scintillator layer formation scheduled surface of the reflective layer; as a result, cracks are produced in the reflective layer to let phosphor crystals grow abnormally and thereby to deteriorate the image quality (in particular, sharpness) of radiographic images obtained via the scintillator panel in which the scintillator layer is disposed on the scintillator layer formation scheduled surface of the deposition substrate. If the glass transition temperature (Tg) of the binder resin is above 60° C., it tends to be that the reflective layer fails to follow deformation experienced during cutting and is separated at the interface between the support and the reflective layer. Further, such an excessively high glass transition temperature is also disadvantageous in that the reflective layer similarly tends to fail to follow deformation experienced during cutting of a scintillator panel in which a scintillator layer is disposed on the scintillator layer formation scheduled surface of the reflective layer in the deposition substrate, and consequently the reflective layer is separated at the interface between the support and the reflective layer or at the interface between the scintillator layer and the reflective layer.

Examples of the binder resins include polyurethane resins, vinyl chloride copolymers, vinyl chloride vinyl acetate copolymers, vinyl chloride vinylidene chloride copolymers, vinyl chloride acrylonitrile copolymers, butadiene acrylonitrile copolymers, polyamide resins, polyvinylbutyrals, polyester resins, cellulose derivatives (such as nitrocellulose), styrene butadiene copolymers, various synthetic rubber resins, phenolic resins, epoxy resins, urea resins, melamine resins, phenoxy resins, silicone resins, acrylic resins and urea formamide resins. Of these, hydrophobic resins such as polyester resins, polyurethane resins and acrylic resins are preferable, and polyester resins and polyurethane resins are more preferable because of excellent interlayer adherability with respect to columnar phosphor crystals formed by deposition and to the support.

From the viewpoint of the cuttability of the deposition substrate, polyester resins having the aforementioned glass transition temperature are particularly preferable.

In the invention, the binder resin having a glass transition temperature (Tg) of −100° C. to 60° C. represents 5 to 100 wt %, preferably 30 to 100 wt %, more preferably 50 to 100 wt %, and particularly preferably 100 wt % relative to the total of the binder resin(s) present in the reflective layer. The binder resins contained in the refractive layer preferably contain at least two binder resins showing different glass-transition temperatures of not less than 5° C., and more preferably 10 to 100° C., from the viewpoint that the film properties of the refractive layer may be easily controlled. Here, the plurality of binder resins may belong to an identical category or different categories as long as their glass transition temperatures are different.

1-2. Supports

Exemplary materials of the supports include various glasses, ceramic materials, semiconductor materials, polymer materials and metals which are transmissive to radiations such as X-rays. Specific examples include plate glasses such as quartz, borosilicate glass and chemically reinforced glass; ceramics such as amorphous carbon, sapphire, silicon nitride and silicon carbide; semiconductors such as silicon, germanium, gallium arsenide, gallium phosphide and gallium nitride; polymer films (plastic films) such as cellulose acetate films, polyester resin films, polyethylene terephthalate films, polyamide films, polyimide films, triacetate films, polycarbonate films and carbon fiber-reinforced resin sheets; metal sheets such as aluminum sheets, iron sheets and copper sheets, as well as metal sheets having layers of oxides of the metals; and bio-nanofiber films. These materials may be used singly or in the form of a stack of materials.

From the viewpoint of processability, the materials for the supports in the invention are preferably flexible. Here, the term "flexible" indicates that the materials can be processed from roll to roll. Such materials preferably have a film thickness of 1 to 1,000 μm and an elastic modulus of 0.1 to 100 GPa, and more preferably a film thickness of 50 to 500 μm and an elastic modulus of 1 to 30 GPa.

In the invention, the "elastic modulus" is a value obtained by testing a JIS-C2318 sample with a tensile tester in accordance with JIS K 7161, and calculating the ratio of the stress over the strain indicated by the gauge marks on the sample, in the range in which the strain stress curve shows a straight relationship. This ratio is called the Young's modulus. In the specification, this Young's modulus is defined as the elastic modulus.

The support materials in the invention are preferably flexible polymer films.

Examples of the flexible polymer films include polymer films formed of polyethylene naphthalate (7 GPa), polyethylene terephthalate (4 GPa), polycarbonate (2 GPa), polyimide (7 GPa), polyetherimide (3 GPa), aramid (12 GPa), polysulfone (2 GPa) and polyether sulfone (2 GPa). (The values in parenthesis are elastic moduli). From the viewpoint of heat resistance during deposition, polyimide is particularly preferable. The values of elastic moduli are variable even in polymer films of the same material, and the values in parenthesis are not absolutely correct and should be considered as a guide.

The flexible polymer film may be a single polymer film, a film of a mixture of the above polymers, or a stack of two or more identical or different polymer layers. In particular, polymer films including polyimide or polyethylene naphthalate are suitable in the case where columnar crystals of a phosphor (scintillator) are formed on the reflective layer by a gas-phase method using cesium iodide as the raw material.

The use of a bio-nanofiber film as the support provides benefits in terms of support characteristics and environmental friendliness because the bio-nanofiber films have characteristics which are not possessed by existing glasses or plastics such as (i) low weight, (ii) strength five times or more greater than iron (high strength), (iii) resistance to swelling by heat (low thermal expansion properties), (iv) being flexible (excellent flexibility), (v) feasibility of various treatments such as mixing, coating and film production, and (vi) combustibility of plant fiber materials.

The support of the deposition substrate is advantageously a polymer film having a thickness of 50 μm to 500 μm. Such a support allows a scintillator panel including the deposition substrate to be bonded to a planar light-receiving element in such a manner that the scintillator panel changes its shape in accordance with the shape of the surface of the planar light-receiving element. Thus, the scintillator panel can be uniformly bonded tightly to the planar light-receiving element even in the presence of deformation or warpage of the deposition substrate caused by deposition. The resultant flat panel detectors can achieve uniform sharpness of radiographic images in the entirety of the light-receiving plane. (Because the bonding between the scintillator panel and the planar light-receiving element is tight and uniform, the entire light-receiving plane of the flat panel detector provides uniform sharpness in the obtainable radiographic images.)

In order to, for example, adjust the reflectance of the support, the support may include a light-shielding layer and/or a light-absorbing layer in addition to the layer of the aforementioned material. Further, the support itself may have light-shielding properties or light-absorbing properties, or may be a colored support.

Examples of the supports having light-shielding properties include various metal plates. Examples of the supports having light-absorbing properties include amorphous carbon plates and films of polymers such as polyimide, polyether imide and aramid.

From the viewpoint of adjusting the reflectance of the deposition substrates, preferred colored supports are resin films containing coloring materials such as pigments and dyes (pigments are more preferable).

Examples of such resins include general thermoplastic resins. Examples of the pigments include common organic and inorganic coloring pigments such as hardly soluble (usually less than 1 g is dissolved in 100 g of water at 20° C.) azo pigments, phthalocyanine blue and titanium black.

Specific examples include insoluble azo pigments such as First Yellow, Disazo Yellow, Pyrazolone Orange, Lake Red 4R and Naphthol Red; condensed azo pigments such as Cromophtal Yellow and Cromophtal Red; azo lake pigments such as Lithol Red, Lake Red C, Watching Red, Brilliant Carmine 6B and Bordeaux 10B; nitroso pigments such as Naphthol Green B; nitro pigments such as Naphthol Yellow S; phthalocyanine pigments such as Phthalocyanine Blue, First Sky Blue and Phthalocyanine Green; threne pigments such as Anthrapyrimidine Yellow, Perinone Orange, Perylene Red, Thioindigo Red and Indanthrone Blue; quinacridone pigments such as Quinacridone Red and Quinacridone Violet; dioxadine pigments such as Dioxadine Violet; isoindolinone pigments such as Isoindolinone Yellow; acidic dye lakes such as Peacock Blue Lake and Alkali Blue Lake; and basic dye lakes such as Rhodamine Lake, Methyl Violet Lake and Malachite Green Lake.

The pigments are preferably used in amounts of 0.01 to 10 parts by weight with respect to 100 parts by weight of the binder resin. This amount of the pigments ensures sufficient coloring of the films and prevents deteriorations in mechanical properties such as elongation and strength of the support resin due to excessive addition of the pigments over the saturated coloration.

1-3. Additional Layers

Where necessary, the deposition substrates may include additional layers in addition to the reflective layer and the support.

In a scintillator panel obtained by forming a scintillator layer on the deposition substrate, it is generally preferable that the luminous efficiency of the scintillator and the sharpness of the obtainable radiographic images be adjusted to desired levels in accordance with the purpose of use of the radiographic image detector. In oral radiography as an example, radiographic images with high sharpness are required because the imaging subjects include dental nerves having fine and complicated structures. Further, the scintillators are required to have high luminous efficiency in pediatric radiography in order to minimally reduce radiation exposure on children susceptible to radiation effects.

According to the invention, the reflectance of the deposition substrates is adjusted as required in the following manner, whereby the scintillator luminous efficiency of scintillator panels obtained by forming scintillator layers on the deposition substrates and the sharpness of the obtainable radiographic images can be adjusted to desired levels.

For example, the reflectance of the deposition substrate may be adjusted by providing at least one of light-shielding layers and light-absorbing layers containing light-absorbing pigments or the like, in addition to the reflective layer and the support. Alternatively, the reflectance of the deposition substrate may be adjusted by coloring the reflective layer or the support layer in the deposition substrate so as to obtain an appropriate reflectance.

In a configuration in which a light-shielding layer or a light-absorbing layer is provided in the deposition substrate, the light-shielding layer or the light-absorbing layer is disposed on the side of the reflective layer opposite to the deposition surface (hereinafter, also referred to as the "scintillator layer formation scheduled surface").

The light-shielding layer or the light-absorbing layer may be provided by stacking a film including a light-shielding layer or a light-absorbing layer.

The reflectance of the deposition substrates may also be adjusted by adopting a support which itself has light-shielding properties or light-absorbing properties. Alternatively, as mentioned earlier, the reflectance of the deposition substrates may be adjusted by coloring the reflective layer or the support with a coloring material. Details in these cases of reflectance adjustment are as described in the sections of "Supports" and "Reflective layers".

In particular, the reflectance is more preferably adjusted by coloring the reflective layer itself with a coloring material because this adjustment may be performed by a simple method in which the coloring material is added to the dispersion of the white pigment and the binder resin, and the resultant coating liquid is applied onto the support.

The above techniques for adjusting the reflectance of the deposition substrates may be adopted singly. However, at least two techniques are preferably adopted in combination for reasons such as that the reflectance of the deposition substrates may be accurately adjusted to a desired value more easily. When both the light-shielding layer and the pigment layer are used, they are preferably disposed in the order of the light-shielding layer and the pigment layer from the support side for the same reason as above.

Hereinbelow, the light-shielding layers and the light-absorbing layers will be described.

The light-absorbing layers are not particularly limited as long as the layers have light-absorbing properties and are colored. For example, layers including a pigment and a binder resin may be used. The pigments in the light-absorbing layers may be any known pigments. Suitable pigments are those capable of absorbing long-wavelength red light which is more prone to scatter, and blue pigments are preferred, with preferred examples including ultramarine blue and Prussian blue (iron ferrocyanide). Further, organic blue pigments such as phthalocyanine, anthraquinone, indigoid and carbonium may also be used. Of these, phthalocyanine is preferable from viewpoints such as radiation durability and UV durability of the light-absorbing layers. Furthermore, titanium black that is a titanium-containing black pigment may be suitably used. Titanium black is a black substance resulting from partial removal of oxygen from titanium dioxide. Because its specific gravity is the same as titanium dioxide, a reflective coating liquid including titanium dioxide as the light-scattering particles and titanium black exhibits high stability. The reflectance of the deposition substrate can be advantageously adjusted easily by regulating the mixing ratio of titanium dioxide and titanium black. Examples of the binder resins in the light-absorbing layers include those described in the section of "Reflective layers". The pigments are preferably used in amounts of 0.01 to 30 parts by weight, and more preferably 0.01 to 10 parts by weight with respect to 100 parts by weight of the binder resin from the viewpoint of the light-absorbing properties of the light-absorbing layer.

From the viewpoint of light-absorbing properties, the thickness of the light-absorbing layer is preferably 1 to 500 µm.

The light-shielding layers include materials having light-shielding properties.

Preferred light-shielding materials for the light-shielding layers are stainless steel and metal materials including one, or two or more elements of aluminum, silver, platinum, palladium, gold, copper, iron, nickel, chromium and cobalt from the viewpoint of the adjustment of the reflectance of the deposition substrates. In particular, aluminum- or silver-based metal materials are particularly preferable because such light-shielding layers exhibit excellent light-shielding properties and corrosion resistance. The light-shielding layer may be comprised of a single film of the metal material, or may include two or more films of the metal materials.

In order to increase the adhesion between the support and the light-shielding layer, an intermediate layer is preferably disposed between the support and the light-shielding layer. Examples of the materials of the intermediate layer include general adhesive polymers (such as polyester resins, polyurethane resins and acrylic resins), as well as metals different from the metals in the light-shielding layers (dissimilar metals). Examples of the dissimilar metals include nickel, cobalt, chromium, palladium, titanium, zirconium, molybdenum and tungsten. The intermediate layer may include one, or two or more kinds of these dissimilar metals. In particular, it is preferable that nickel or chromium, or both of these metals be contained from the viewpoint of the light-shielding properties of the light-shielding layer. From the viewpoint of light-shielding properties, the thickness of the light-shielding layer is preferably 1 to 500 µm.

The light-shielding layer made of such a metal material also serves as an antistatic layer and thus may be suitably used for antistatic purposes. Such an antistatic layer may be formed instead of or in combination with the addition of an antistatic agent to the reflective layer. In this case, from the viewpoint of antistatic properties of the deposition substrates, the surface resistivity measured with respect to the surface of the reflective layer opposite to the surface in contact with the support is preferably not more than $1.0 \times 10^{12} \Omega/\square$, more preferably not more than $1.0 \times 10^{11} \Omega/\square$, and most preferably not more than $1.0 \times 10^{10} \Omega/\square$ ($\square$ in the unit $\Omega/\square$ means square and has no dimension. The same applies hereinafter.)

As discussed above, the deposition substrates of the invention include the support and the reflective layer disposed on the support, and the reflective layer includes the light-scattering particles and the binder resin with a specific glass transition temperature (Tg) and has a specific thickness. With this configuration, the deposition substrates of the invention exhibit excellent cuttability and realize scintillator panels exhibiting excellent cuttability and giving radiographic images such as X-ray images with excellent sensitivity and sharpness.

In the inventive deposition substrate, the binder resin which has a specific Tg exhibits excellent adhesion with respect to the support and excellently follows deformation experienced during cutting. As a result, the deposition substrate and a scintillator panel including the deposition substrate achieve excellent cuttability, and the deposition substrate does not suffer problems such as the separation of the reflective layer even when subjected to cutting, and the scintillator panel is free from problems such as the separation of a scintillator layer even when subjected to cutting.

Further, the reflective layer in the inventive deposition substrate has a specific thickness to ensure that the reflective layer will not become separated from the support because of the thickness being so small that the reflective layer cannot withstand the impact applied during cutting as well as to ensure that cracks will not be generated during film production because of the thickness being so large and accordingly there will occur no abnormal growth of phosphor crystals during deposition, thus resulting in the realization of excellent sharpness of radiographic images obtained via a scintillator panel including the deposition substrate.

Furthermore, the sharpness of radiographic images obtained via a scintillator panel including the deposition substrate is further improved when the volatile content in the reflective layer in the deposition substrate is in the specific range.

Furthermore, the deposition substrates and scintillator panels including the substrates may be manufactured in a specific size without the need for fabricating individual deposition substrates with the specific size separately, and may be manufactured in such a manner that the deposition substrates and scintillator panels are manufactured with a larger size than the desired size and are thereafter cut into individual deposition substrates or scintillator panels having the desired size. Thus, the deposition substrates and scintillator panels including the substrates ensure uniform quality within the lot or between the lots.

After the formation of a scintillator layer on the inventive deposition substrate, the layer configuration is in the order of the support, the reflective layer and the scintillator layer. This layer configuration permits the scintillator panel to be freely attached to and removed (detached) from a planar light-receiving element. Thus, in the event of any problems in the planar light-receiving element or the scintillator panel, the loss caused by such problems can be minimized.

2. Scintillator Panels

A scintillator panel according to the present invention includes a support, a reflective layer disposed on the support, and a scintillator layer formed on the reflective layer by deposition. The reflective layer includes light-scattering particles and a binder resin with a glass transition temperature of −100° C. to 60° C. The thickness of the reflective layer is 5 to 300 µm.

In the scintillator panel of the invention, it is preferable that a protective layer described later be provided in addition to the reflective layer and the scintillator layer. In the inventive scintillator panel, a light-absorbing layer may be disposed on the side of the reflective layer opposite to the surface on which the scintillator layer is disposed. Further, the scintillator panel of the invention may be supported on a support plate having higher rigidity than the deposition substrate.

Hereinbelow, constituents such as layers and elements in the inventive scintillator panels will be described.

2-1. Supports and Reflective Layers

In contrast to the case described in the deposition substrate above, the order of the arrangement of the support and the reflective layer may be changed appropriately in accordance with the purpose. The supports and the reflective layers are similar to those in the deposition substrates, and thus will not be described anew.

In the scintillator panel of the invention, it is preferable that the reflective layer be located between the support and the scintillator layer and include the light-scattering particles and the binder resin. With this configuration, the luminous efficiency of the scintillator panel is advantageously increased.

2-2. Scintillator Layers

In the scintillator panel of the invention, the scintillator layer is preferably formed by the growth of columnar crystals from the surface of the reflective layer.

Examples of the materials for the scintillator layers include known phosphors such as NaF, NaCl, NaBr, NaI, KF, KCl, KBr, KI, RbF, RbCl, RbBr, RbI, CsF, CsCl, CsBr and CsI. Of these, cesium iodide (CsI) is preferable from the viewpoints that the X-rays to visible light conversion ratio is relatively high, that columnar crystals can be formed easily by deposition, and that the scattering of light in the crystals is suppressed by the light guide effects ascribed to the crystal structure and consequently the thickness of the phosphor layer can be increased corresponding to the amount of suppressed scattering.

However, because the luminous efficiency obtained with CsI alone is low, the scintillator layer preferably includes CsI in combination with any of various activators. Examples of such scintillator layers include a scintillator layer disclosed in JP-B-S54-35060 which contains CsI and sodium iodide (NaI) in an appropriate molar ratio. Further, an example of preferred scintillator layers is one disclosed in JP-A-2001-59899 which contains CsI and activators such as thallium (Tl), europium (Eu), indium (In), lithium (Li), potassium (K), rubidium (Rb) and sodium (Na) in an appropriate molar ratio.

In the scintillator panel of the invention, a particularly preferred scintillator layer includes cesium iodide and an activator(s) including one or more thallium compounds. In particular, thallium-activated cesium iodide (CsI:Tl) is preferable because this material has a wide emission wavelength range from 300 nm to 750 nm.

Various thallium compounds (thallium (I) compounds and thallium (III) compounds) may be used, with examples including thallium iodide (TlI), thallium bromide (TlBr), thallium chloride (TlCl) and thallium fluoride (TlF and $TlF_3$). In particular, thallium iodide (TlI) is preferable because CsI is activated to a higher degree.

The thallium compounds preferably have a melting point in the range of 400 to 700° C. This melting point of the thallium compounds ensures that the activator is uniformly distributed in the columnar crystals in the scintillator layer formed by deposition, resulting in an improvement in luminous efficiency. Herein, the melting point is measured at normal pressure (usually about 0.101 MPa).

In the scintillator panel of the invention, the relative content of the activators in the scintillator layer is preferably 0.1 to 5 mol %.

Herein, the relative content of the activators is the molar percentage of the activators relative to 1 mole of the phosphor matrix compound taken as 100 mol %.

The term "phosphor matrix compound" refers to the phosphor itself such as CsI that is not activated with activators. The raw materials for the scintillator layers such as the phosphor matrix compounds and the activators are collectively referred to as phosphor raw materials.

The scintillator layer may be comprised of a single layer or may include a scintillator main layer and a scintillator underlayer which has a higher void content than the scintillator main layer. (The scintillator underlayer is disposed between the scintillator main layer and the reflective layer.)

Herein, the term "void content" refers to the ratio of the total cross sectional area of voids to the total cross sectional area of the columnar phosphor crystals plus the voids with respect to a cross section of the scintillator layer that has been cut parallel to the plane of the support at an arbitrary position in the columnar phosphor crystals including the scintillator underlayer.

The void content may be determined by cutting the phosphor layer of the scintillator panel parallel to the plane of the support, and analyzing a scanning electron micrograph of the cross section with use of an image processing software to obtain the cross sectional areas of the phosphor portions and the voids.

In the scintillator underlayer, the relative content of the activator is preferably 0.01 to 1 mol %, and more preferably 0.1 to 0.7 mol %.

In particular, the relative content of the activator in the underlayer is highly preferably not less than 0.01 mol % in terms of the enhancement of emission brightness as well as the storage properties of the scintillator panels.

In the invention, it is highly preferable that the relative content of the activator in the scintillator underlayer be lower than the relative content of the activator in the scintillator main layer. The ratio of the relative content of the activator in the scintillator underlayer to the relative content of the activator in the scintillator main layer ((relative content of activator in scintillator underlayer)/(relative content of activator in scintillator main layer)) is preferably 0.1 to 0.7.

From viewpoints such as the luminous efficiency of the scintillator layer, the degree of orientation based on an X-ray diffraction spectrum with respect to a plane of the phosphor in the scintillator layer having a certain plane index is preferably in the range of 80 to 100% at any position in the direction of layer thickness. For example, the plane index in the columnar crystals of thallium-activated cesium iodide (CsI:Tl) may be any of indices including (100), (110), (111), (200), (211), (220) and (311), and is preferably (200). (For the plane indices, refer to X-Sen Kaiseki Nyuumon (Introduction to X-ray analysis) (Tokyo Kagaku Dojin), pp. 42-46.)

Herein, the "degree of orientation based on an X-ray diffraction spectrum with respect to a plane having a certain plane index" indicates the proportion of the intensity Ix of the certain plane index relative to the total intensity I of the total including planes with other plane indices. For example, the degree of orientation of the intensity I200 of the (200) plane in an X-ray diffraction spectrum is obtained by: "Degree of orientation=I200/I".

For example, the plane indices for the determination of the orientation degree may be measured by X-ray diffractometry (XRD) (crystal X-ray diffractometry or powder X-ray diffractometry). The X-ray diffractometry is a versatile analytical technique capable of identifying substances or giving information about structures such as crystal phase structures by utilizing a phenomenon in which a characteristic X-ray having a specific wavelength is diffracted by crystalline substances according to the Bragg's equation. The illumination targets may be Cu, Fe and Co, and the illumination outputs are generally about 0 to 50 mA and about 0 to 50 kV in accordance with the performance of the apparatus.

The columnar phosphor crystals may be formed by a gas-phase method. Examples of the gas-phase methods include deposition and sputtering. Several gas-phase methods may be performed in combination. For example, the phosphor matrix (CsI) may be vaporized and deposited by deposition and the activator raw material by sputtering. Even activator raw materials having a high melting point (compounds having a melting point of 1000° C. or above and are hardly vaporized by deposition) may be used by adopting sputtering for the vaporization of the activator raw materials.

The thickness of the scintillator layer is preferably 100 to 800 µm, and more preferably 120 to 700 µm because this thickness ensures that a good balance is obtained between the brightness of the scintillator panel and the sharpness of the obtainable radiographic images.

The thickness of the scintillator underlayer is preferably 0.1 μm to 50 μm, and more preferably 5 μm to 40 μm from the viewpoints of high brightness of the scintillator panel and ensuring the sharpness of the obtainable radiographic images.

2-2. Protective Layers

Where necessary, the scintillator panels of the invention may have a protective layer which physically or chemically protects the phosphor layer. From viewpoints such as the prevention of deliquescence of the scintillator in the scintillator layer described later, it is preferable that the entire surface of the phosphor layer opposite to the support side be covered with a continuous protective layer, and it is more preferable that the entire surface of the scintillator layer and a portion of the reflective layer of the scintillator panel be covered with a continuous protective layer.

Here, the "entire surface of the phosphor (scintillator) layer" refers to all the regions of the columnar phosphor crystal scintillator layer including the surface opposite to the surface in contact with the substrate as well as the lateral sides (in other words, all the surfaces which are not in contact with the substrate). Further, the "portion of the reflective layer" refers to all the regions of the reflective layer which are not in contact with the scintillator layer or the support and are exposed to the atmosphere (in other words, the lateral sides of the reflective layer). The term "continuous protective layer" means that the protective layer covers the region completely without any exposure or whatsoever.

The protective layer may be formed of a single material, a mixed material, or a plurality of films or the like including different materials.

As mentioned above, the main purpose of the protective layer in the invention is to protect the scintillator layer. In detail, cesium iodide (CsI) as an example of the phosphors is highly hygroscopic and deliquesces when left in the air by absorbing vapor in the air. To prevent this, the protective layer is disposed in the scintillator panel.

The protective layer also functions to block substances (such as halogen ions) released from the phosphor in the scintillator panel and to prevent the corrosion of a light-receiving element placed in contact with the scintillator layer.

In a configuration in which the columnar phosphor crystal scintillator layer of the scintillator panel and a photoelectric light-receiving element are coupled together through a medium such as an adhesive or an optical oil, the protective layer also serves as an anti-penetration layer preventing the penetration of the adhesive or the optical oil between the columnar phosphor crystals.

As will be described below, the protective layer may be directly formed on the scintillator layer by a CVD method or a coating method, or may be provided by stacking a preliminarily prepared polymer film (or protective film) onto the scintillator layer.

When the protective layer is directly formed on the scintillator layer by a CVD method or a coating method, preferred materials for forming the protective layer include polyolefin resins, polyacetal resins, epoxy resins, polyimide resins, silicone resins and polyparazylylene resins. The polyparaxylylene resins may be applied by a CVD method, and the other materials may be applied by a coating method. Examples of the polyparaxylylene resins include polyparaxylylene, polymonochloroparaxylylene, polydichloroparaxylylene, polytetrachloroparaxylylene, polyfluoroparaxylylene, polydimethylparaxylylene and polydiethylparaxylylene.

From the viewpoints of appropriate protection of the scintillator layer as well as the strength and the flexibility of the scintillator panel, the thickness of the protective layer is preferably 0.1 μm to 2000 μm.

In the case where the protective layer is a film including a polyparaxylylene resin, the film thickness is preferably 2 μm to 15 μm from the viewpoints of the sharpness of radiographic images and the moisture proofness of the protective layer. In the case where the protective layer is bonded to a light-receiving element, the thickness of the adhesive layer is preferably not less than 5 μm, and more preferably not less than 10 μm in order to ensure adhesion, and the total thickness of the protective layer and the adhesive layer is preferably not more than 20 μm. When the total thickness of the polyparaxylylene layer and the adhesive layer is not more than 20 μm, the protective layer and a light-receiving element may be bonded while the scattering of light in the gap between the planar light-receiving element and the scintillator panel is suppressed and thus a decrease in sharpness can be advantageously prevented.

Examples of the polymer films which may be disposed on the scintillator layer include polyester films, polymethacrylate films, nitrocellulose films, cellulose acetate films, polypropylene films, polyethylene terephthalate films and polyethylene naphthalate films. These polymer films are easily available in the market. In terms of transparency and strength, these polymer films may be suitably used as the protective layers in the inventive scintillator panels.

The polymer film may be preferably applied onto the scintillator layer (onto all the surfaces of the scintillator layer which are not in contact with other surfaces such as the reflective layer and are exposed to the atmosphere, or further onto the exposed portion of the reflective layer) by a method in which the polymer film is bonded to the scintillator surface through the adhesive layer, or a method in which the polymer films larger than the scintillator panel are arranged to vertically interpose the scintillator panel therebetween, and the regions of the upper and lower polymer films outside of the periphery of the scintillator panel are bonded together by fusion or with an adhesive in a vacuum environment. The thickness of the polymer film is preferably 12 μm to 120 μm, and more preferably 20 μm to 80 μm from viewpoints such as the protection and moisture proofness for the scintillator layer, the sharpness of the obtainable radiographic images, and the workability during the production of scintillator panels.

In another embodiment, a hot melt resin layer may be formed on the phosphor layer so as to serve as a protective layer. In this case, the hot melt resin also functions to bond the surface of the scintillator layer of the scintillator panel to the surface of a light-receiving element, in addition to the function as a protective layer.

Herein, the term "hot melt resin" refers to an adhesive resin which is free from water or solvents and is solid at room temperature (usually about 25° C.) and which includes a nonvolatile thermoplastic material. The hot melt resins become molten when the resin temperature is raised to or above the melting onset temperature by heating or the like, and become solid when the resin temperature falls to or below the solidification temperature. Further, the hot melt resins exhibit tackiness in the thermally molten state and have no tackiness (become non-tacky) in the solid state when the resin temperature is decreased to or below the solidification temperature (for example, to normal temperature).

Suitable hot melt resins are those based on polyolefin resins, polyester resins or polyamide resins, but are not limited thereto. Of these, polyolefin resins are more preferable in view of light transmission properties.

From viewpoints such as continuous use characteristics and the prevention of adhesive separation in planar light-receiving elements such as thin film transistors (TFTs), the melting onset temperature of the hot melt resins is preferably 60° C. to 150° C. The melting onset temperature of the hot melt resins may be adjusted by the addition of plasticizers.

The thickness of the hot melt resin is preferably not more than 50 μm, and more preferably not more than 30 μm.

Preferably, the entirety of the top and lateral sides of the scintillator layer as well as the peripheral surface of the reflective layer in the deposition substrate is covered with polyparaxylylene. According to this configuration, high moisture proofness is obtained.

The haze of the protective layer is preferably 3% to 40%, and more preferably 3% to 10% in view of factors such as the sharpness and uniformity in the obtainable radiographic images, as well as the production stability and workability in the production of scintillator panels. (The haze is a value measured with NDH5000W manufactured by NIPPON DENSHOKU INDUSTRIES CO., LTD.) Materials having a haze in the above range may be easily selected from such polymer films in the market, or may be fabricated in accordance with appropriate manufacturing methods.

The optical transmittance of the protective layer is preferably not less than 70% with respect to 550 nm light in view of factors such as the photoelectric conversion efficiency of the scintillator panels and the emission wavelengths of the phosphors (scintillators). Because materials (such as films) having an optical transmittance of 99% or more are difficult to obtain in the industry, however, a practical preferred range of the optical transmittance is from 99% to 70%.

The moisture permeability of the protective layer measured at 40° C. and 90% RH in accordance with JIS Z 0208 is preferably not more than 50 g/m$^2$ day, and more preferably not more than 10 g/m$^2$·day from viewpoints such as the protection of the scintillator layer and the prevention of deliquescence. Because films having a moisture permeability of 0.01 g/m$^2$·day or less are difficult to obtain in the industry, however, a practical preferred range of the moisture permeability is from 0.01 g/m$^2$·day to 50 g/m$^2$·day, and more preferably from 0.1 g/m$^2$·day to 10 g/m$^2$·day.

2-3. Support Plates

When it is desired that the scintillator panel of the invention do not exhibit flexibility in accordance with the purpose of use or the like, the scintillator panel may be held on a support plate having higher rigidity than the deposition substrate.

Here, the term "rigidity" refers to the degree of resistance to dimensional changes (deformation) when materials are subjected to a bending or torsional force. Higher (greater) rigidity permits a smaller deformation by such a force, and lower (smaller) rigidity causes a larger deformation. In terms of the selection of materials, the rigidity may be increased by using materials having a high elastic modulus. The elastic modulus is defined as described hereinabove.

In order to make sure that the scintillator panel will not exhibit flexibility (in other words, the scintillator panel will exhibit high rigidity), the elastic modulus of the support plate on which the scintillator panel is held is preferably not less than 10 GPa, and more preferably not less than 30 GPa. Specifically, any materials such as metals, glasses, carbons and composite materials may be suitably used without limitation.

From the viewpoint of transmission of radiations such as X-rays, the thickness of the support plate is preferably adjusted such that the X-ray transmittance will be 80% or more when the scintillator panel is illuminated with X-rays at a tube voltage of 80 kV. In detail, the thickness is preferably about 0.3 mm to 2.0 mm for amorphous carbon plates, and about 0.3 mm to 1.0 mm for glass plates.

As discussed above, the scintillator panels of the invention do not suffer the separation of the scintillator layer during cutting and can give radiographic images such as X-ray images with excellent sharpness and sensitivity.

In the inventive scintillator panel, the binder resin which has a specific Tg exhibits excellent adhesion with respect to the support and the scintillator layer, and excellently follows deformation experienced during cutting. As a result, the scintillator panel does not suffer problems such as the separation of the scintillator layer even when subjected to cutting.

Further, the reflective layer in the inventive scintillator panel has a specific thickness to ensure that the reflective layer will not become separated from the support because of the thickness being so small that the reflective layer cannot withstand the impact applied during cutting as well as to ensure that cracks will not be generated during film production because of the thickness being so large and accordingly there will occur no abnormal growth of crystals during deposition, thus resulting in the realization of excellent sharpness of the obtainable radiographic images.

Furthermore, the sharpness of radiographic images obtained via the scintillator panel is further improved when the volatile content in the reflective layer is in the specific range.

Furthermore, the scintillator panels of the invention may be manufactured in a specific size without the need for fabricating individual scintillator panels with the specific size separately, and may be manufactured in such a manner that the scintillator panels are manufactured with a larger size than the desired size and are thereafter cut into individual scintillator panels having the desired size. Thus, the scintillator panels ensure uniform quality within the lot or between the lots.

In the scintillator panel of the invention, the layer configuration may be in the order of the support, the reflective layer and the scintillator layer. This layer configuration permits the scintillator panel to be freely attached to and removed (detached) from a planar light-receiving element. Thus, in the event of any problems in the planar light-receiving element or the scintillator panel, the loss caused by such problems can be minimized.

3. Deposition Substrate Production Methods 3-1. Procedures in Deposition Substrate Production Methods Next, methods for producing the deposition substrates of the invention will be described.

The deposition substrates of the invention may be produced by adopting an appropriate known method in accordance with the purpose. Here, a typical example will be described with reference to FIG. 7.

Figure 7:
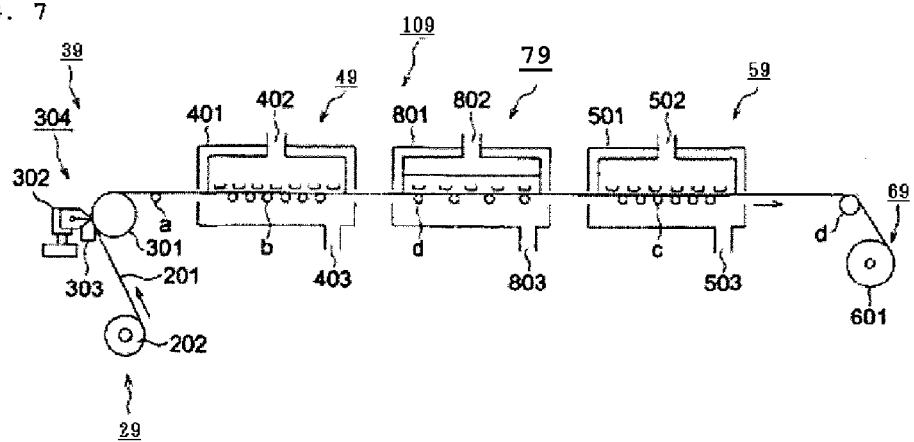
FIG. 7 is a schematic view illustrating a typical example of methods for producing the deposition substrates of the invention.

FIG. 7 is a schematic view illustrating a typical example of the methods for producing the deposition substrates of the invention.

In the typical example of the deposition substrate production methods, a deposition substrate production apparatus 109 schematically illustrated in FIG. 7 is used. The deposition substrate production method involving the production apparatus 109 preferably includes a workpiece (support) feed step 29, an application step 39, drying steps 49 and 79, a heat treatment step 59, and a recovery step 69.

In the feed step 29, a feeder (not shown) is used.

In the feed step 29, a roll 202 of a support 201 wound around a core is dispensed by the feeder and the support is fed to the subsequent application step 39.

In the application step 39, an applicator 304 is used which includes a backup roll 301, an application head 302, and a vacuum chamber 303 disposed upstream the application head 302.

In the application step 39, the support 201 continuously fed by the feeder in the feed step 29 is held by the backup roll 301, and the application head 302 applies a reflective coating liquid to the support 201, the reflective coating liquid including light-scattering particles, a binder resin, additives and a solvent. The reflective coating liquid is applied to the support 201 in such a manner that the vacuum chamber 303 disposed upstream the application head 302 generates a vacuum to stabilize the bead (a pool of the coating liquid) formed during the application between the support 201 and the coating liquid supplied from the application head 302.

The vacuum chamber 303 is configured such that the degree of vacuum can be adjusted. The vacuum chamber 303 is connected to a vacuum blower (not shown), which evacuates the inside of the vacuum chamber. The vacuum chamber 303 is airtight, is located adjacent to the backup roll 301 with a small gap, and is evacuated to an appropriate degree of vacuum to suction the upstream of the bead (on the feeder side relative to the application head), thus allowing the coating liquid to form a stable bead.

The flow rate of the coating liquid ejected from the application head 302 is adjusted as required via a pump (not shown).

Although extrusion coating is illustrated above as an example of the application methods, any of other known application methods may also be used, with examples including gravure coating, roll coating, spin coating, reverse coating, bar coating, screen coating, blade coating, air knife coating and dipping.

In the drying step 49, a dryer 401 is used.

In the drying step 49, the reflective coating film layer formed by the application of the reflective coating liquid onto the support 201 in the application step 39 is dried by the dryer 401. The drying step 49 is usually performed such that the surface temperature of the reflective coating film layer is raised to 80 to 200° C. In the drying step 49, the reflective coating film layer is dried with a drying gas. The drying gas is introduced through a drying gas inlet 402 and is discharged through an outlet 403. The dryer 401 is configured such that the temperature and the flow rate of the drying air including the drying gas can be determined appropriately.

The drying step 79 has the same configuration as in the drying step 49, and thus detailed description thereof will be omitted. The drying step 79, in combination with the drying step 49, allows for the adjustment of the speed of drying of the reflective coating film layer.

In the heat treatment step 59, the support 201 having the reflective coating film layer is heat treated with a heat treatment apparatus 501 to remove volatile components in the reflective coating film layer. The heat treatment is usually performed such that the surface temperature of the reflective coating film layer reaches 150° C. to 250° C. In the heat treatment step, the reflective coating film layer is heat treated with a heat treatment gas. The heat treatment gas is introduced through an inlet 502 and is discharged through an outlet 503. The heat treatment apparatus 501 is configured such that the temperature and the flow rate of the heat treatment gas can be determined appropriately.

Although not illustrated in FIG. 7, the heat treatment step 59 may be followed by a cooling step in which the support having the reflective layer (the deposition substrate) is cooled.

In the recovery step 69, the support 201 on which the reflective coating film layer has been formed is wound with a winding machine (not shown). The reference sign 601 in FIG. 7 indicates a recovered roll of the support wound on a core.

In the above steps, the support 201 having the coating film is conveyed on conveyor rolls a to d.

In the case where the reflective layer is produced in a multilayer structure or additional layers other than those described above are formed by application, the support on which a first reflective layer has been formed may be wound into a roll in the recovery step 69, and the wound support 601 may be again set as a support 201 in the feed step 29 and be subjected to the steps in which a reflective coating liquid is applied onto the reflective layer, dried and heat treated to form the reflective layer including two or more layers. Where necessary, the obtained deposition substrate may be heat treated to increase the adhesion of the interface between the two or more layers in the reflective layer.

In the method for producing the deposition substrates of the invention, the surface temperature of the reflective coating film layer is raised to 80° C. to 200° C. in the drying steps 49 and 79, and is elevated to 150° C. to 250° C. in the heat treatment step 59. In this manner, the amount of volatile components (the volatile content) in the deposition substrate (the support having the reflective layer) may be reduced to less than 5%. One of the characteristics of the inventive deposition substrate production methods is that the heat treatment step is carried out after the drying steps to remove volatile components.

The surface temperature of the reflective coating film layer formed on the support 201 may be measured with a known non-contact thermometer such as a laser thermometer or an infrared thermometer.

The temperature and the flow rate of the gases in the drying steps 49 and 79 and in the heat treatment step 59 are not particularly limited and may be appropriately adjusted based on the results of measurement with a non-contact thermometer such that the surface temperature of the coating film will fall in the above prescribed temperature range.

In the drying steps 49 and 79, it is preferable that the gas flow at a relative speed of 1 to 3 m/sec with respect to the support 201 in a direction parallel to the plane of the support, as measured at a position 5 mm above the surface of the coating film on the support 201. When the relative speed of the gas to the support 201 at a position 5 nm above the coating film surface is in the above range, the reflective layer can be dried without suffering problems such as roughening of the dried surface.

In the heat treatment step 59, the surface of the coating film may be heated with the heat treatment gas in combination with an infrared heater. Such a combined heat treatment advantageously increases the effects of the heat treatment on the reflective layer on the support.

By the inventive deposition substrate production methods described above, deposition substrates having small amounts of residual solvents and small amounts of gases adsorbed to the light-scattering particles may be obtained.

3-2. Materials Used in Deposition Substrate Production Methods

Hereinbelow, the supports and the reflective coating liquids used in the methods for producing the inventive deposition substrates will be described.

3-2-1. Supports

The materials of the supports used in the inventive deposition substrates are as described hereinabove. In particular, polymer films are preferable from viewpoints such as that the production apparatus 109 illustrated in FIG. 7 may be suitably used, that the polymer films can be easily processed from roll to roll, and that the flexibility of the polymer films allows the scintillator panels to be intimately coupled to planar light-receiving elements. In order to prevent the deformation of the supports by heat applied during the deposition of phosphors onto the polymer films, the glass transition temperature of the polymer films is preferably not less than 100° C. In detail, suitable such polymer films are polyimide films.

Where necessary, additional layers such as the aforementioned light-shielding layers and light-absorbing layers may be appropriately disposed on the support. Further, the support itself may have light-shielding properties or light-absorbing properties as required.

The light-shielding layer may be provided on the support by any methods without limitation such as deposition, sputtering and metal foil lamination. From the viewpoint of the adhesion of the light-shielding layer with the support, sputtering is most preferable.

For example, the light-absorbing layer may be provided on the support by applying a coating liquid containing components such as a light-absorbing pigment onto the support and drying the coating.

3-2-2. Reflective Coating Liquids

The reflective coating liquid may be prepared by dispersing or dissolving in a solvent individual components or a mixture of the components including light-scattering particles, a binder resin and optional additives such as coloring materials including pigments, UV absorbers, fluorescent whitening agents, antistatic agents and dispersants. The procedures such as the sequence of the addition of the components are not particularly limited as long as the objects of the invention are not deteriorated.

The light-scattering particles, the binder resin and the additives may be dispersed or dissolved by any known dispersion or dissolution methods. Exemplary dispersing machines which may be suitably used include sand mills, Attritor, Pearl Mill, Super Mill, ball mills, impellers, dispersers, KD mills, colloid mills, Dynatron mills, three roll mills and pressure kneaders.

The details of the light-scattering particles, the binder resin, the coloring materials such as pigments, the UV absorbers and the fluorescent whitening agents are as described hereinabove.

The dispersants are added in order to help the light-scattering particles be dispersed in the binder resin. Various dispersants may be used in accordance with the binder resin and the light-scattering particles used. Examples thereof include polyhydric alcohols, amines, silicones, phthalic acid, stearic acid, caproic acid, and lipophilic surfactants. The dispersants may remain in or may be removed from the reflective layer that has been formed.

The dispersants are preferably used in amounts of 0.05 to 10 parts by weight, and more preferably 1 to 5 parts by weight with respect to 100 parts by weight of the binder resin.

The light-scattering particles, the binder resin and the additives may be dispersed or dissolved in any solvents without limitation. Examples of the solvents include lower alcohols (preferably alcohols having 1 to 6 carbon atoms) such as methanol, ethanol, n-propanol and n-butanol; chlorinated hydrocarbons such as methylene chloride and ethylene chloride; ketones such as acetone, methyl ethyl ketone and methyl isobutyl ketone; aromatic compounds such as toluene, benzene, cyclohexane, cyclohexanone and xylene; esters of lower fatty acids with lower alcohols such as methyl acetate, ethyl acetate and butyl acetate; ethers such as dioxane, ethylene glycol monoethyl ether, ethylene glycol monomethyl ether and propylene glycol monomethyl ether acetate; and mixtures of these solvents.

The light-scattering particles, the binder resin and the additives may exhibit insufficient dispersibility in a single solvent. Further, the use of a single solvent may cause difficulties in controlling the solvent evaporation rate in the drying steps and tends to result in a reflective layer having a roughened surface. To prevent such problems, it is preferable to use a mixed solvent including a plurality of compatible solvents having different amounts of evaporation heat. In particular, a mixed solvent including toluene, methyl ethyl ketone (MEK) and cyclohexanone is preferable.

When voids are introduced into the reflective layer in the inventive deposition substrate, the methods for forming such voids are not particularly limited and may be selected appropriately in accordance with the purpose. Examples of the methods include (I) void particles are added to the reflective layer, and (II) a reflective coating liquid containing bubbles or a foaming agent is applied onto the support to form a reflective layer having a porous structure. In particular, the method (I) of adding void particles is preferable from the viewpoint of the easiness in the formation of the coating film. From the viewpoint of the void volume, the method (II) utilizing bubbles is preferable.

In the method (II) utilizing bubbles, the foaming agents may be appropriately selected from known foaming agents in accordance with the purpose. Suitable examples include carbon dioxide-generating compounds, nitrogen gas-generating compounds, oxygen gas-generating compounds, and microcapsule foaming agents. Examples of the carbon dioxide-generating compounds include bicarbonates such as sodium hydrogencarbonate. Examples of the nitrogen gas-generating compounds include a mixture of $NaNO_2$ and $NH_4Cl$; azo compounds such as azobisisobutylonitrile and diazoaminobenzene; and diazonium salts such as p-diazodimethylaniline chloride zinc chloride, morpholinobenzenediazonium chloride zinc chloride, morpholinobenzenediazonium chloride fluoroborate, p-diazoethylaniline chloride zinc chloride, 4-(p-methylbenzoylamino)-2,5-diethoxybenzenediazonium zinc chloride, and sodium 1,2-diazonaphthol-5-sulfonate. Examples of the oxygen gas-generating compounds include peroxides. Examples of the microcapsule foaming agents include microcapsule particulate foaming agents encapsulating low-boiling substances vaporized at low temperatures (which may be liquid or solid at normal temperature). Specific examples of the microcapsule foaming agents include microcapsules 10 to 20 μm in diameter in which low-boiling vaporizable substances such as propane, butane, neopentane, neohexane, isopentane and isobutylene are encapsulated in microcapsules made of polystyrene, polyvinyl chloride, polyvinylidene chloride, polyvinyl acetate, polyacrylate ester, polyacrylonitrile, polybutadiene or any copolymer of these polymers. The content of the foaming agent in the binder resin cannot be specified because it is variable in accordance with the types of the foaming agents. However, it is generally preferable that the content be 1 to 50 wt %.

In the method (I) in which void particles are added, the void volume in the reflective layer may be adjusted by adding the void particles to, for example, the reflective coating liquid in such an amount that the void particles will represent 5 to 30 vol % relative to the entirety of the reflective layer taken as 100 vol %. In the method (II) utilizing bubbles, the void volume in the reflective layer may be adjusted by adding the foaming agent to, for example, the reflective coating liquid in such an amount that 1 to 50 wt % of the foaming agent is added to the reflective layer relative to the binder resin taken as 100 wt %. Voids may be introduced into the reflective layer with the aforementioned volume fraction relative to the volume of the reflective layer by any of these methods.

From the viewpoint of X-ray transmission properties of the deposition substrates, part of or all the voids are preferably formed of hollow particles.

The reflectance of the deposition substrates may be adjusted by, for example, the following methods.

(1) On the support, a light-shielding layer is provided which is formed of stainless steel or a material including one, or two or more elements of aluminum, silver, platinum, palladium, gold, copper, iron, nickel, chromium and cobalt.

(2) A light-absorbing layer is provided on the support.

(3) A light-shielding layer, a light-absorbing layer, or a film including at least one of these layers is stacked onto the support.

(4) Light-absorbing properties are imparted to the support.

(5) Light-reflecting properties are imparted to the support.

(6) The reflective layer is colored.

(7) The content of light-scattering particles in the reflective layer, or the thickness of the reflective layer is controlled.

(8) At least two of the methods (1) to (7) are combined.

By combining the methods (1) to (7), the reflectance and the absorptance of the inventive deposition substrates with respect to the light (produced in the scintillator layer) may be adjusted freely. Further, the sensitivity of radiographic image detectors may be enhanced by increasing the optical reflectance of the deposition substrates. By increasing the optical absorptance of the deposition substrates, radiographic image detectors that include scintillator panels obtained by forming scintillator layers on the inventive deposition substrates may provide radiographic images with improved sharpness. When a metallic light-shielding layer is provided as the aforementioned light-shielding layer and the obtained deposition substrate is used in a scintillator panel, advantages are obtained in that because the deposition substrate has a lowered optical transmittance, it becomes possible to prevent the entry of external light or electromagnetic waves through the surface of the support opposite to the surface in contact with the reflective layer as well as to prevent the leakage of the light produced in the scintillator layer to the outside of the scintillator panel. In particular, the use of a highly reflective metal such as aluminum or silver as the aforementioned light-shielding layer is advantageous in that the reflectance of the reflective layer including the light-scattering particles and the binder resin can be further increased.

A light-shielding layer including the aforementioned metal material may be formed on surfaces such as the support by any methods without limitation such as deposition, sputtering and metal foil lamination. From the viewpoint of adhesion, sputtering is most preferable.

The reflective layer itself may be colored with a coloring material by any methods without limitation. From viewpoints such as simplicity, a colored reflective layer is more preferably formed on the support by adding the aforementioned coloring material to the reflective coating liquid and applying the resultant reflective coating liquid to the support.

Preferred pigments which may be added to the reflective coating liquid include titanium black that is a titanium-containing black pigment. Examples of the titanium blacks suitably used in the invention include Titanium Black S type, M type and M-C type manufactured by Mitsubishi Materials Corporation.

A light-absorbing layer may be provided on the support or a film to be stacked on the support in a similar manner as above. That is, a light-absorbing layer may be formed easily by dispersing or dissolving the aforementioned coloring material and other components such as a binder resin in a solvent, and applying the resultant coating liquid onto the support or the film followed by drying.

At the start of the deposition for the formation of the scintillator layer on the inventive deposition substrate, the volatile content in the reflective layer is preferably less than 7.5%, more preferably less than 5%, still more preferably less than 2.5%, and further preferably less than 1% relative to the total mass of the reflective layer. This volatile content ensures that the abnormal growth of columnar phosphor crystals can be prevented.

Herein, the volatile content is defined by the following equation.

$$\text{Volatile content (mass \%)} = [(M-N)/N] \times 100$$

M is the total mass of the reflective layer before heat treatment, and N is the total mass of the reflective layer after being heat treated at 200° C. for 3 minutes.

When the volatile content is in the aforementioned range, the release of gas by volatilization from the reflective layer is reduced during the process in which columnar phosphor crystals are grown by deposition under high temperature and high vacuum conditions. Thus, it becomes possible to suppress the abnormal growth of columnar phosphor crystals in portions from which the volatile components have flown out. Consequently, deteriorations in the sharpness and the uniformity of sharpness in the obtainable radiographic images can be prevented.

When the volatile content in the reflective layer of the deposition substrate is outside the aforementioned range, the deposition substrate may be subjected to a volatile component removal step to reduce the volatile content in the reflective layer to the above range.

The volatile component removal step is a step in which the volatile components in the reflective layer of the deposition substrate are removed in vacuum and/or at a high temperature. In the step, any known methods may be used as long as the volatile components can be removed. Due to easy operations, a more preferred method is performed in such a manner that the inventive deposition substrate is set to a substrate holder of a deposition apparatus, thereafter the substrate holder is heated to 100° C. or above and at the same time the deposition apparatus is evacuated to a vacuum of 100 Pa or less, and the reflective layer of the deposition substrate is heat treated for several minutes to several hours.

The volatile components are mainly residual solvents in the reflective layer formed by the application and drying of the reflective coating liquid, and also gases that have been adsorbed to the white pigment used as a raw material. In particular, gases such as vapor ($H_2O$) and carbon dioxide ($CO_2$) are easily adsorbed to the white pigment even in a low humidity environment. Thus, the volatile component removal step is more preferably performed immediately before the scintillator layer is formed by deposition.

3-3. Cutting of Deposition Substrates

The inventive deposition substrate, after being cut as required to the size of a substrate holder of a deposition apparatus, is set to the substrate holder and is subjected to deposition to form a scintillator layer on the reflective layer. The deposition substrate may be cut by any known cutting methods without limitation. From viewpoints such as workability and cutting accuracy, a cutting method using a force-cutting blade, a decorative cutting machine, a punching machine, a laser or the like is preferable.

Because of its excellent cuttability, the inventive deposition substrate can be cut without the occurrence of problems such as the separation of the reflective layer under conditions where the cutting environment temperature is around room temperature (usually 25° C.). Thus, the deposition substrate production method involving the step of cutting the inventive deposition substrate entails less thermal energy for the implementation of cutting and is thus advantageous in terms of aspects such as production cost, production efficiency, work safety and work efficiency.

From the above viewpoint, the cutting temperature is preferably 20° C. to 40° C.

Because the above cutting method can perform cutting of the inventive deposition substrates while avoiding defects, if any, present in the deposition substrates, the deposition substrate production method utilizing the deposition substrate cutting method achieves excellent productivity.

4. Scintillator Panel Manufacturing Methods

The scintillator panels of the invention may be manufactured by any methods without limitation as long as the objects of the invention are not deteriorated. Preferably, the scintillator panels are manufactured by a deposition method which utilizes a deposition apparatus having a deposition source and a support rotating mechanism in a vacuum container and which includes a step in which the deposition substrate is set to the support rotating mechanism such that the support side of the deposition substrate is in contact with the mounting surface of the support rotating mechanism, and a phosphor raw material is deposited onto the scintillator layer formation scheduled surface of the deposition substrate while rotating the deposition substrate having the support.

Figure 2:
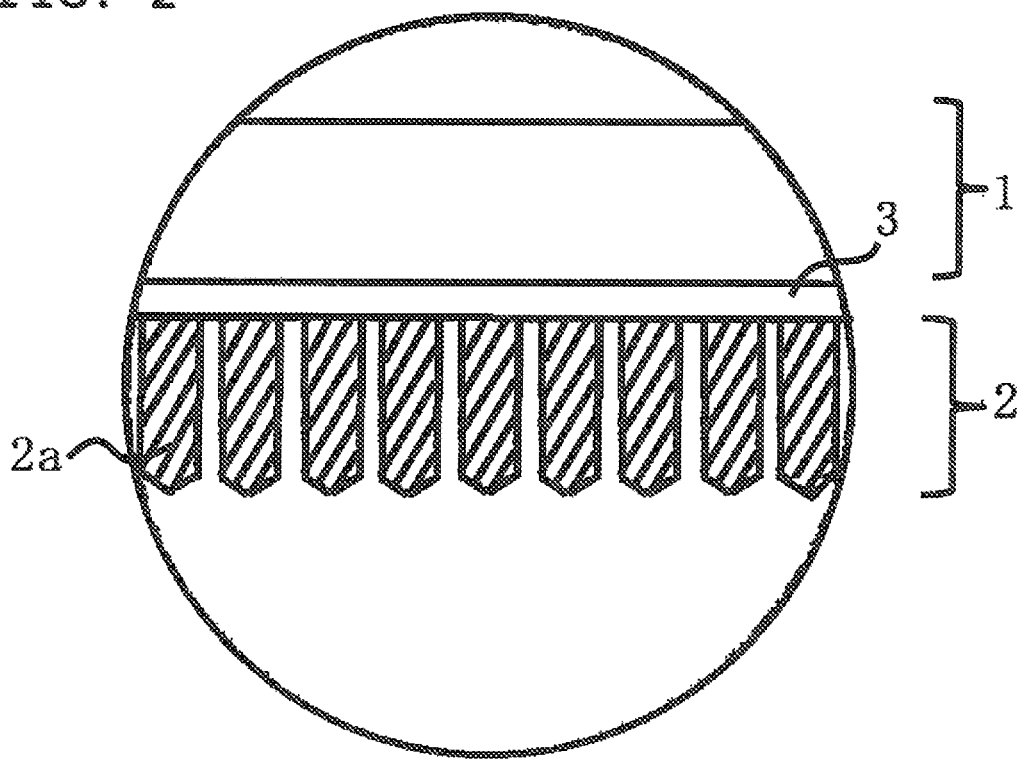
FIG. 2 is an enlarged sectional view of the radiographic scintillator panel 10.
Figure 3:
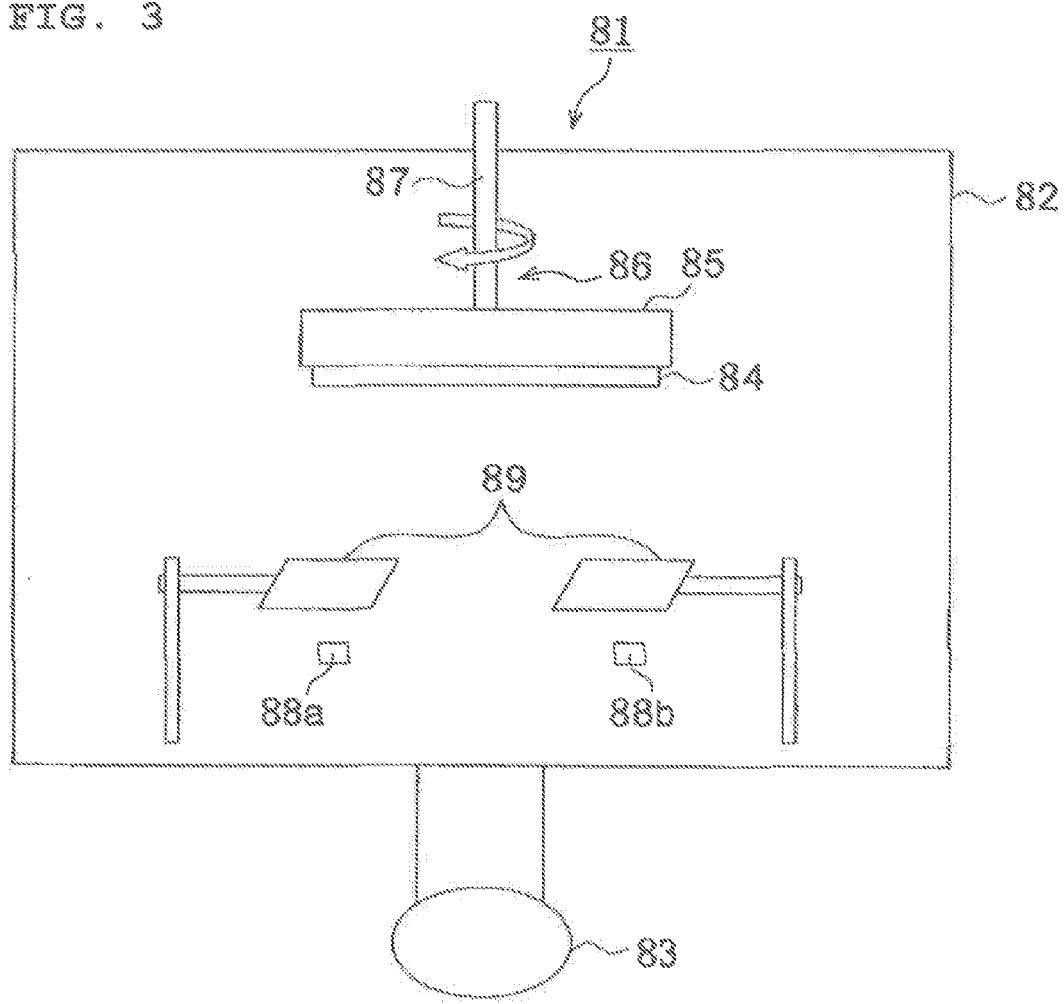
FIG. 3 is a schematic view illustrating a configuration of a deposition apparatus 81 as an example of deposition apparatuses.

A typical example of the methods for manufacturing the inventive scintillator panels will be described with reference to FIGS. 1 to 3. FIG. 1 is a schematic sectional view illustrating a configuration of a scintillator panel 10 as an example of the inventive scintillator panels. FIG. 2 is an enlarged sectional view of the scintillator panel 10 in FIG. 1. FIG. 3 is a schematic view illustrating a configuration of a deposition apparatus 81 as an example of the deposition apparatuses.

The scintillator panels of the invention may be preferably manufactured by a method utilizing the deposition apparatus 81 described in detail below. Hereinafter, a method for manufacturing radiographic scintillator panels 10 using the deposition apparatus 81 will be described.

4-1. Deposition Apparatuses

As illustrated in FIG. 3, the deposition apparatus 81 has a box-shaped vacuum container 82. Near the bottom of the inside of the vacuum container 82, deposition sources 88a and 88b for vacuum deposition are arranged opposite to each other on the circumference of a circle about the central line perpendicular to a deposition substrate 84. The deposition sources 88a and 88b are members into which a deposition material is packed. Electrodes are connected to the deposition sources 88a and 88b. In this case, the gap between the deposition substrate 84 and the deposition sources 88a and 88b is preferably 100 to 1500 mm, and more preferably 200 to 1000 mm. The gap between the central line perpendicular to the deposition substrate 84 and the deposition sources 88a and 88b is preferably 100 to 1500 mm, and more preferably 200 to 1000 mm. The deposition apparatus 81 is configured such that the deposition sources 88a and 88b generate heat by Joule heating by the passage of an electric current through the deposition sources 88a and 88b via the electrodes. In the manufacturing of the radiographic scintillator panels 10, a mixture including cesium iodide and an activator compound is packed in the deposition sources 88a and 88b, and the mixture is heated and vaporized by the passage of an electric current through the deposition sources 88a and 88b. Three or more (for example, eight, sixteen or twenty four) deposition sources 88 may be provided. The deposition sources 88 may be arranged at regular or irregular intervals. The radius of the circle about the central line perpendicular to the deposition substrate 84 may be selected freely.

In order to heat the phosphor contained therein by resistance heating, the deposition sources 88a and 88b may be comprised of alumina crucibles wrapped with a heater, or may be comprised of boats or heaters including high-melting metals or similar materials. The phosphor heating method is not limited to resistance heating and may be any of other methods such as electron beam heating and high frequency induced heating. However, a resistance heating method by the direct application of an electric current, or an indirect resistance heating method by indirect heating of the crucibles with a surrounding heater is preferable because of advantages such as that the method has a relatively simple configuration and is easy to operate, inexpensive and applicable to a very wide range of substances. The deposition sources 88a and 88b may be configured utilizing molecular beam sources according to molecular beam epitaxy.

In the inside of the vacuum container 82, a holder 85 configured to hold the deposition substrate 84 is arranged above the deposition sources 88a and 88b. The holder 85 is provided with a heater (not shown) and is configured to heat the deposition substrate 84 attached to the holder 85 by the operation of the heater. The deposition apparatus 81 is configured, by performing heating of the deposition substrate 84, to detach or remove substances adsorbed to the surface of the deposition substrate 84, to prevent an impurity layer from occurring between the deposition substrate 84 and a scintillator layer (a phosphor layer) formed on the substrate surface, to increase the adhesion between the deposition substrate 84 and the scintillator layer formed on the substrate surface, and to control the quality of the scintillator layer formed on the surface of the deposition substrate 84.

The holder 85 is configured to hold the deposition substrate 84 such that the scintillator layer formation scheduled surface of the deposition substrate 84 is opposed to the bottom of the vacuum container 82 and in parallel to the bottom of the vacuum container 82. The holder 85 is provided with a rotating mechanism 86 capable of rotating the deposition substrate 84 together with the holder 85 in a horizontal direction. The rotating mechanism 86 is comprised of a rotating shaft 87 which supports the holder 85 and rotates the deposition substrate 84, and a motor (not shown) which is arranged outside the vacuum container 82 and serves as a power supply driving the rotating shaft 87. The deposition apparatus 81 is configured such that driving of the motor causes the rotation of the rotating shaft 87 and consequently the rotation of the holder 85 while keeping the holder 85 opposed to the deposition sources 88a and 88b.

Preferably, the holder 85 is fitted with a heater (not shown) for heating the deposition substrate 84. By heating the deposition substrate 84 with the heater, the adhesion of the support of the deposition substrate 84 with respect to the holder 85 can be increased, and the quality of the phosphor layer can be controlled. Such heating also detaches or removes substances which have been adsorbed to the surface of the deposition substrate 84, and prevents an impurity layer from occurring between the surface of the deposition substrate 84 and the phosphor layer. Further, the holder 85 may have a warm or hot medium circulating mechanism (not shown) as a unit for heating the deposition substrate 84. This heating unit is suitable when the temperature of the deposition substrate 84 is maintained at a relatively low temperature such as 50 to 150° C. during the deposition of the phosphor. Furthermore, the holder 85 may have a halogen lamp (not shown) as a unit for heating the deposition substrate 84. This heating element is suited when the temperature of the deposition substrate 84 is maintained at a relatively high temperature such as 150° C. or above during the deposition of the phosphor.

In addition to the above configuration, the deposition apparatus 81 includes a vacuum pump 83 connected to the vacuum container 82. The vacuum pump 83 evacuates the vacuum container 82 and introduces a gas to the inside of the vacuum container 82. The inside of the vacuum container 82 can be maintained in a constant pressure gas atmosphere by the operation of the vacuum pump 83. In order to evacuate the vacuum container 82 to a high vacuum, two or more types of vacuum pumps having different operating pressure ranges may be arranged. Examples of the vacuum pumps include rotary pumps, turbo-molecular pumps, cryogenic pumps, diffusion pumps and mechanical boosters.

The deposition apparatus 81 includes a mechanism configured to introduce a gas into the vacuum container 82 in order to adjust the pressure in the chamber. The gas introduced here is generally an inert gas such as Ne, Ar or Kr. The pressure in the vacuum container 82 may be adjusted by introducing the gas to the desired pressure while evacuating the vacuum container 82 with the vacuum pump 83, or may be adjusted in such a manner that the vacuum container 82 is evacuated to a vacuum lower than the desired pressure, the evacuation is then terminated, and the gas is introduced to the desired pressure. The pressure in the vacuum container 82 may be adjusted by another approach, for example, by providing a pressure control valve between the vacuum container 82 and the vacuum pump 83 so as to adjust the amount of gas evacuated by the pump.

Between the deposition substrate 84 and the deposition sources 88a and 88b, a shutter 89 is provided which can be opened and closed in a horizontal direction to block the space extending from the deposition sources 88a and 88b to the deposition substrate 84. The shutter 89 is closed at the initial stage of deposition, whereby even in the event that impurities, if any, which have become attached to the surface of the phosphor contained in the deposition sources 88a and 88b are vaporized at the initial stage of deposition, the attachment of such impurities to the deposition substrate 84 can be prevented. The shutter 89 is opened after the above purpose is fulfilled, and the phosphor raw material is successfully deposited to form a scintillator layer without allowing any impurities to be deposited to the deposition substrate 84.

4-2. Formation of Scintillator Layers

The deposition substrate 84 having the reflective layer 3 on the support 1 is set to the holder 85, whilst the deposition sources 88a and 88b are arranged near the bottom of the vacuum container 82 on the circumference of a circle about the central line perpendicular to the deposition substrate 84. Next, the same number of containers such as crucibles or boats as the deposition sources (two in this case) are filled with a phosphor raw material such as a powdery mixture including a phosphor matrix compound such as cesium iodide and an activator such as thallium iodide, and the filled containers are packed into the deposition sources 88a and 88b (preparation step). In the case where a scintillator underlayer and a scintillator main layer are sequentially formed on the reflective layer, the phosphor matrix compound such as cesium iodide and the activator such as thallium iodide may be separately packed into the deposition sources. In any of these cases, it is preferable that the gap between the surface of the reflective layer of the deposition substrate 84 and the deposition sources 88a and 88b be set to 100 to 1500 mm and the deposition step described later be performed while keeping the gap in the range that has been set.

Where necessary, preliminary heating may be performed prior to the deposition in order to remove impurities in the packed phosphor matrix and activator. The preliminary heating temperature is desirably not more than the melting point of the materials used. For example, the preliminary heating temperature is preferably 50 to 550° C., and more preferably 100 to 500° C. in the case of CsI, and is preferably 50 to 500° C., and more preferably 100 to 500° C. in the case of TlI.

To prevent the impurities from being deposited to the deposition substrate 84, the preliminary heating is preferably performed with the shutter 89 closed.

After the preparation step, the vacuum pump 83 is activated to evacuate the vacuum container 82 and the inside of the vacuum container 82 is brought to a vacuum atmosphere of 0.5 Pa or less, and preferably 0.1 Pa or less (vacuum atmosphere creating step). Here, the term "vacuum atmosphere" refers to an atmosphere in a pressure of not more than 100 Pa, and the vacuum container 82 is preferably evacuated to a vacuum atmosphere in a pressure of not more than 0.1 Pa. Thereafter, the inert gas such as Ar is introduced into the vacuum container 82, and the inside of the vacuum container 82 is maintained in a vacuum atmosphere at 0.1 Pa or less. Next, the heater of the holder 85 as well as the motor of the rotating mechanism are driven, and thereby the deposition substrate 84 mounted to the holder 85 is rotated and heated while being opposed to the deposition sources 88a and 88b. (The rotational speed (rpm) is variable depending on the size of the apparatus, but is preferably 2 to 15 rpm, and more preferably 4 to 10 rpm.)

Next, the phosphor is deposited. For example, the phosphor such as CsI may be activated by a method in which the phosphor such as CsI and the activator such as a sodium compound, a thallium compound, an indium compound or a europium compound are vaporized simultaneously in the deposition apparatus and are deposited onto the deposition substrate. Particularly, in this method of deposition through the simultaneous vaporization of the phosphor and the activator, the phosphor is preferably CsI from viewpoints such as that the columnar crystal structure provides light guide effects, and the activator compound is preferably an iodide such as sodium iodide (NaI), thallium iodide (TlI) or indium iodide (InI) from viewpoints such as that these iodides do not inhibit the growth of columnar CsI crystals.

Alternatively, the phosphor may be activated by a method in which an activator-free scintillator layer comprised of columnar crystals of the phosphor such as CsI is formed first by deposition on the deposition substrate, thereafter the substrate having the scintillator layer is placed in a closed space such as in a deposition apparatus together with the activator compound such as a sodium compound, a thallium compound, an indium compound or a europium compound, and the activator compound is heated to or above its sublimation temperature to activate the phosphor such as CsI, namely, to activate the scintillator layer. In this method in which the substrate having the scintillator layer is heat treated together with the activator, it is preferable that the substrate placed in the closed space, specifically, the scintillator layer formed of the phosphor such as CsI have been heated to a temperature of 100 to 350° C. The phosphor is preferably CsI from viewpoints such as that the columnar crystal structure provides light guide effects, and the activator compound is, although not particularly limited, preferably one having a low sublimation temperature for easy handling. In an embodiment, the phosphor that is deposited first may be CsI which has been activated with a specific compound (for example, thallium iodide (TlI)). According to such an embodiment, the resultant scintillator layer contains different kinds of activators between the inside and the surface of the CsI columnar crystals. In particular, the decay time of the radiation emitted from the scintillator layer may be shortened by using a europium compound as the activator.

When any scintillator underlayer is not formed on the reflective layer, an electric current is passed through the deposition sources 88a and 88b via the electrodes while the deposition substrate 84 is being heated and rotated, and thereby the phosphor raw material such as a mixture including cesium iodide and thallium iodide is vaporized by being heated at about 700° C. to 800° C. for a prescribed time. As a result, a great number of columnar phosphor crystals 2a are gradually grown on the surface of the deposition substrate 84, thus forming a scintillator layer 2 with a desired thickness (deposition step). The thickness of the scintillator layer may be variable in accordance with the purpose, but is preferably 120 to 700 µm.

When a scintillator underlayer is formed on the reflective layer, a crucible containing the phosphor matrix compound (such as CsI without activators (pure)) may be heated to allow the phosphor to be deposited into a scintillator underlayer (a first phosphor layer).

In this process, the temperature of the deposition substrate 84 is preferably 5 to 200° C., more preferably 5 to 100° C., and particularly preferably 15 to 50° C. The thickness of the scintillator underlayer may be variable depending on the crystal diameters or the thickness of the phosphor layers, but is preferably 0.1 to 50 µm. Subsequently, heating of the deposition substrate 84 is initiated to raise the temperature of the deposition substrate 84 to 150 to 250° C., and operations are started to vaporize a phosphor raw material including the remaining portion of the phosphor matrix compound (such as CsI without activators (pure)) and the activator (such as TlI), thus forming a scintillator main layer (a second phosphor layer). During this process, the activator is migrated by heat from the scintillator main layer to the scintillator underlayer, and consequently the relative content of the activator in the scintillator underlayer is adjusted to 0.01 to 1 mol %.

In this process, it is preferable from the viewpoint of productivity that the phosphor matrix compound be deposited at a higher deposition rate than that in the formation of the underlayer. Although variable depending on the thicknesses of the scintillator underlayer and the scintillator main layer, the rate of this deposition is preferably 5 to 100 times higher, and more preferably 10 to 50 times higher than the rate of deposition of the scintillator underlayer. The activator may be vaporized in such a manner that the activator alone is vaporized or that a deposition source including a mixture of CsI and TlI is prepared and heated to a temperature (for example, 500° C.) at which CsI is not vaporized but TlI is vaporized.

Because the deposition substrate 84 heated during the deposition is hot, its temperature needs to be cooled for the substrate to be removed. In the cooling step, the deposition substrate 84 may be cooled to 80° C. at an average cooling rate in the range of 0.5° C. to 10° C./min. This cooling rate advantageously ensures that the cooling can be performed without causing damages to the deposition substrate 84 due to the thermal shrinkage of the support by quenching. The cooling of the deposition substrate 84 under this condition is particularly effective when, for example, the support in the deposition substrate 84 is a relatively thin film such as a polymer film having a thickness of 50 µm to 500 µm. In order to avoid any discoloration of the scintillator layer, this cooling step is particularly preferably performed in an atmosphere having a vacuum degree of $1 \times 10^{-5}$ Pa to 0.1 Pa. During the cooling step, an inert gas such as Ar or He may be introduced into the vacuum container of the deposition apparatus. Here, the average cooling rate is determined by continuously measuring the time and the temperature from the start of the cooling (the completion of the deposition) to when the temperature is cooled to 80° C., and calculating the cooling rate per 1 minute.

In the deposition method, reactive deposition may be carried out by introducing a gas such as $O_2$ or $H_2$ as required.

Of the aforementioned columnar phosphor crystal formation methods, the manufacturing method preferably includes a step in which a scintillator underlayer having a higher void content than a phosphor main layer is formed on the surface of the substrate, and a step in which the phosphor is deposited by a gas-phase deposition method on the surface of the scintillator underlayer to form the scintillator main layer. This configuration is preferable in order to satisfy the aforementioned requirement regarding the plane index.

The scintillator panels of the invention may be manufactured in the manner described above.

The formation of the scintillator layer on the reflective layer under the aforementioned deposition conditions is advantageous in that the scintillator layer is formed by the growth of columnar phosphor crystals at the interface thereof with the reflective layer.

According to the scintillator panel manufacturing method using the deposition apparatus 81, the arrangement of a plurality of deposition sources 88a and 88b allows the vapors from the deposition sources 88a and 88b to be corrected or put in order at their confluence with the result that the crystallinity of the phosphor deposited on the surface of the deposition substrate 84 becomes uniform. Increasing the number of deposition sources increases the number of confluences at which correction occurs, thus resulting in uniform crystallinity of the phosphor over a wider range. By the arrangement of the deposition sources 88a and 88b on the circumference of a circle about the central line perpendicular to the deposition substrate 84, the effects of the correction of vapors providing uniform crystallinity can be obtained isotropically on the surface of the deposition substrate 84.

From the viewpoints described later, the obtained scintillator panels are preferably subjected to post treatments such as the heat treatment and the pressure treatment described below.

4-3. Heat Treatment for Scintillator Layers

Preferably, the scintillator layer formed on the reflective layer of the deposition substrate is placed in a closed space evacuated to 1.0 Pa or below together with one or more activators selected from sodium compounds, thallium compounds, europium compounds and indium compounds, and is subjected to additional activation by heating the activator compound(s) to or above the sublimation temperature to vaporize the compound(s). By this heat treatment, the emission characteristics of the scintillator layer may be adjusted. In this case, the phosphor such as CsI deposited on the deposition substrate is preliminarily heated to a temperature of 250° C. After the additional activation is performed for 1 hour, the deposition substrate having the additionally activated scintillator layer is cooled to 50° C. or below (preferably at an average cooling rate of 0.5° C. to 10° C./min) and the scintillator panel is removed from the closed space in the deposition apparatus. In this manner, scintillator panels having an additionally activated scintillator layer may be obtained. Without the use of any activator compounds, the heat treatment may be performed singly for 1 hour according to the similar procedures. In this case, the activator that has been added during the deposition is activated, and a scintillator panel having high emission intensity may be obtained.

4-4. Pressure Treatment for Scintillator Layers

When a scintillator layer is deposited on the reflective layer of the inventive deposition substrate, the layer formed is usually a collection of columnar phosphor crystals having a uniform height from the interface thereof with the reflective layer. However, problems such as the abnormal growth of phosphor crystals may take place locally and consequently the scintillator layer may have less uniform heights of the columnar phosphor crystals (but the objects of the invention are still achieved). For example, such abnormal growth of columnar phosphor crystals may be caused by factors such as dusts suspended in the deposition apparatus, splash during deposition, and substrate defects such as scratches or attachment of foreign substances. Here, the term "splash" during deposition indicates a phenomenon in which molecules of solid CsI are emitted before vaporization and become attached to the deposition substrate (see, for example, JP-A-2006-335887).

The abnormally grown columnar phosphor crystals can be a factor deteriorating the properties such as sharpness of radiographic images obtained through the scintillator panels (but the objects of the invention are still achieved). Thus, it is desirable to perform the following pressure treatment so that the abnormally grown columnar phosphor crystals will not be left as such. It is needless to mention that even when there are no abnormally grown columnar phosphor crystals, the implementation of the following pressure treatment is more preferable in order to obtain scintillator panels having a more uniform height of columnar crystals from the interface between the crystals and the reflective layer.

The surface of the scintillator layer of the scintillator panel obtained as described above is subjected to a pressure treatment to align the heights of the columnar phosphor crystals in the scintillator layer from the interface with the reflective layer. By the treatment, it becomes possible to obtain scintillator panels which have a scintillator layer comprised of a collection of more uniform columnar phosphor crystals.

Here, the term "heights from the interface with the reflective layer" indicates the heights from a middle line (JIS B 0601-2001) at half the height of roughness on the surface of the reflective layer.

Here, the term "aligned" indicates that the differences in height of the columnar crystals forming the scintillator layer as measured from the interface with the reflective layer are 20 μm or less.

Although the heights of the columnar crystals forming the scintillator layer are defined as extending from the interface with the reflective layer, portions of the columnar crystals other than the portions above the interface with the reflective layer may be present in the inside of the reflective layer (portions of the columnar crystals may be buried in the binder resin in the reflective layer).

When the scintillator layer of the scintillator panel is brought into close contact with (or is bonded to) a light-receiving element, the reflective layer in the scintillator panel exhibits flexibility so as to absorb irregularities on the surface of the scintillator layer (the irregularities on the scintillator layer are smoothed by the force applied when the light-receiving element is closely contacted with the scintillator panel, and the reflective layer is deformed in accordance with the smoothing), with the result that the uniformity in resolution in the entire light-receiving plane is improved. In order to further enhance the uniformity in close contact between the scintillator and the light-receiving element, it is advantageous to align the heights of the columnar crystals by pressing the scintillator surface with a flat surface such as a roller or a flat glass before the inventive scintillator is brought into close contact with (or is bonded to) the light-receiving element.

From the viewpoints described above, the pressure treatment is preferably carried out such that the maximum difference in the heights of the columnar crystals forming the scintillator layer will be about 20 μm.

In detail, the pressure treatment may be performed by a method in which the surface of the scintillator layer of the scintillator panel is pressed with a roller or a flat surface such as glass so as to crush the abnormal protrusions and thereby to align the heights of the columnar phosphor crystals, or may be performed by a method utilizing atmospheric pressure. However, the methods are not particularly limited thereto as long as uniform pressurization is feasible. (The magnitude of the pressure may be adjusted appropriately so that the purpose of this treatment can be achieved.)

Particularly in the case where the heights of the columnar phosphor crystals are aligned by pressing the scintillator surface with a roller or a flat plate such as glass, the treatment is more preferably performed while giving a constant pressure force to the roller or the glass plate due to reasons which will be described later. The roller or the glass plate may be preliminarily heated to 80° C. to 200° C. Further, the treatment may involve a flat glass plate which is given quick oscillations by a device such as an ultrasonic vibrator. In this manner, the heights of the ends of the columnar phosphor crystals may be aligned with a less force.

In a more specific example of the methods for aligning the heights of the columnar phosphor crystals, a flat glass plate is placed in close contact with the surface of the scintillator layer of the scintillator panel, then resin films are arranged on and under the scintillator panel-glass assembly and the peripheries of the resin films are fusion bonded together in vacuum to seal the assembly; after the scintillator panel-glass assembly is sealed in the resin films, the scintillator panel in that state is heat treated at 50° C. to 200° C. for about 0.5 to 100 hours. This method is preferable from the viewpoint of the easiness of the pressure treatment.

Through the pressure treatment for the scintillator layer at a temperature not less than the glass transition temperature of the binder resin, the abnormally grown columnar phosphor crystals are pushed into the reflective layer and consequently the scintillator layer attains uniform aligned heights of the columnar phosphor crystals (the differences in height are within 20 μm). That is, the reflective layer in the invention contains the binder resin with the specific glass transition temperature and has the specific thickness so as to be easily plastically deformed by pressure and absorb the abnormally grown columnar phosphor crystals.

The pressure treatment for aligning the heights of the columnar phosphor crystals surpasses other methods such as adjusting the heights by grinding the abnormally grown portions of columnar phosphor crystals, in terms of the facts that high productivity is obtained because there is no generation of wastes such as dusts by the destruction of the columnar phosphor crystals and thus there are no needs for the removal of such wastes, as well as that the quality can be controlled in an advantageous manner.

According to the scintillator panel manufacturing methods of the invention, scintillator panels can be provided which exhibit excellent cuttability and do not suffer problems such as the separation of the reflective layer or the scintillator layer even when subjected to a cutting operation and which have uniform crystallinity of the phosphor in the scintillator layer. Such scintillator panels may provide devices such as flat panel detectors which show uniform image quality in the light-receiving plane and can give radiographic images excellent in sharpness and uniformity of sharpness as well as in sensitivity. Further, because the inventive scintillator panel manufacturing methods can produce scintillator panels that do not suffer problems such as the separation of the reflective layer or the scintillator layer even when subjected to a cutting operation, advantages such as excellent productivity can be obtained by performing the deposition in any scale possible in the deposition apparatus (preferably in the largest scale possible in view of the merits described later) and thereafter cutting the produced scintillator panels into desired sizes as required.

According to the inventive scintillator panel manufacturing methods, the scintillator panel may be freely attached to and removed (detached) from a planar light-receiving element. Thus, in the event of any problems in the planar light-receiving element or the scintillator panel, the loss caused by such problems can be minimized.

4-5. Scintillator Panel Cutting Methods

In the case where the area of the scintillator panel of the invention is larger than the area of the surface of a photoelectric element such as a light-receiving element, the scintillator panel is cut to a size corresponding to the area of the surface of the light-receiving element as required. Because the cutting takes place after the scintillator layer is formed on the reflective layer of the deposition substrate, there are no complicated procedures involved such as those encountered when a plurality of deposition substrates having different sizes are provided in conformity to the sizes of light-receiving elements in radiographic image detectors and these deposition substrates with respective sizes are separately subjected to the phosphor deposition. That is, the deposition may be performed in any scale possible in the deposition apparatus (preferably in the largest scale possible in view of the merits described below) and thereafter the produced scintillator panels may be cut into desired sizes as required. This provides merits in, for example, productivity, adherence to delivery deadlines, and uniformity in quality between the lots or within the lot.

Because of its excellent cuttability, the inventive scintillator panel can be cut without the occurrence of problems such as the separation of the reflective layer in the deposition substrate or the separation of the scintillator layer from the deposition substrate under conditions where the cutting environment temperature is around room temperature (usually 25° C.). Thus, the scintillator panel manufacturing method involving the step of cutting the inventive scintillator panel entails less thermal energy for the implementation of cutting and is thus advantageous in terms of aspects such as production cost, production efficiency, work safety and work efficiency. Further, the heights of columnar crystals are aligned under specific conditions during the manufacturing of scintillator panels and consequently the sharpness of the obtainable radiographic images can be further improved.

From the above viewpoint, the cutting temperature is preferably 20° C. to 40° C.

A typical example of the methods used in the cutting step for cutting the inventive scintillator panels will be described. (Methods using a force-cutting blade will be described in EXAMPLES later, and thus the description thereof is omitted here.)

Figure 8A:
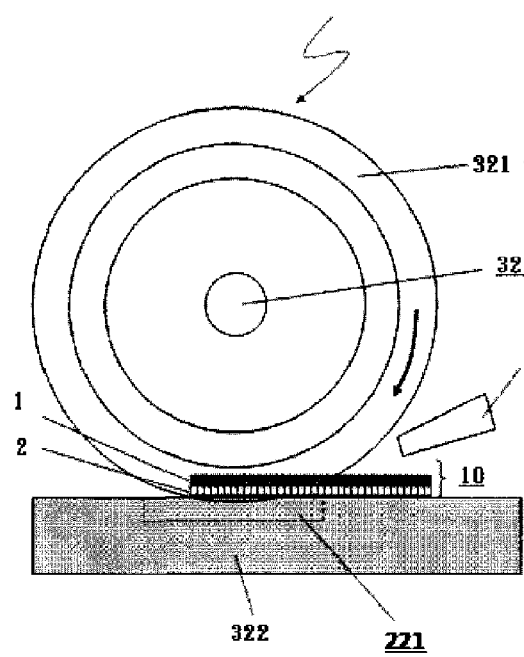
FIGS. 8A and 8B are schematic views illustrating a typical example of methods used in a scintillator panel cutting step.
Figure 8B:
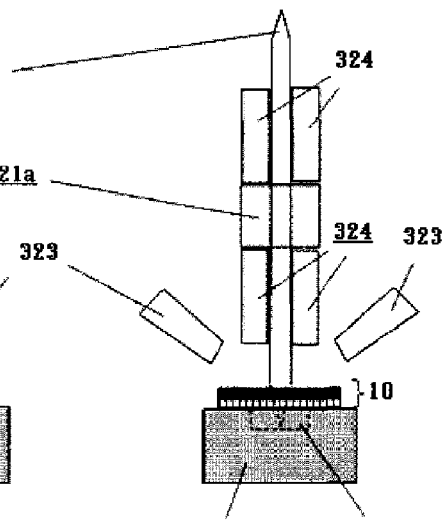

FIGS. 8A and 8B illustrate an example of cutting of a scintillator panel 10 by blade dicing. The scintillator panel 10 is arranged on a dicing table 322 of a dicing apparatus 32 such that a scintillator layer 2 comes downward in contact with the dicing table 322. The scintillator panel 10 is cut with a blade 321 inserted from the support 1 side (the side opposite to the scintillator layer 2 side). The blade 321 cuts the scintillator panel 10 by rotating about a rotational shaft 321a. The dicing table 322 has a groove 221 for receiving the blade 321 which has penetrated the scintillator panel 10. On both sides of the blade 321, support members 324 are provided in order to fix the blade 321. To cool the frictional heat generated during the cutting of the scintillator panel 10 with the blade 321, cooling air is blown to the cut from nozzles 323 disposed on both sides of the blade 321. The temperature of the cooling air is usually not more than 4° C. To prevent condensation, the indoor humidity is usually controlled to not more than 20%. Blade dicing may be suitably adopted when the supports in the scintillator panels are based on carbon, aluminum and glass.

Figure 9:
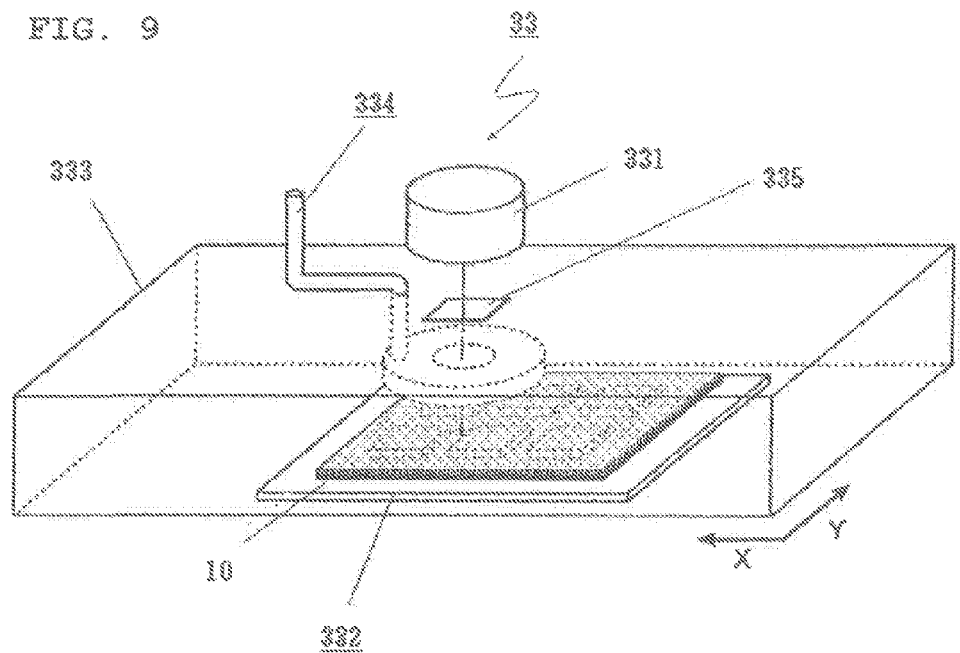
FIG. 9 is a schematic view illustrating a typical example of laser cutting of a scintillator panel with a laser.

FIG. 9 illustrates an example of laser cutting in which a scintillator panel 10 is cut with a laser. A laser cutting apparatus 33 includes a box-shaped purge chamber 333. The purge chamber 333 defines a substantially airtight space protected from the entry of dusts or whatsoever suspended in the outside space. The inside of the purge chamber 333 is preferably a low-humidity environment. The top face of the purge chamber 333 has a translucent window 335 through which a laser beam is transmitted. Further, the purge chamber 333 is fitted with a discharge pipe 334 through which suspended substances such as dusts are introduced to the outside of the purge chamber 333.

The scintillator panel 10 is mounted on a support table 332 of the laser cutting apparatus 33. In this case, the scintillator panel 10 may be mounted with the scintillator layer 2 upside or downside. The scintillator panel 10 is held on the support table 332 by suction. The scintillator panel 10 mounted on the support table 332 is guided by a support table moving unit (not shown) to a position immediately below a laser of a laser beam generator 331. The scintillator panel 10 is cut by the application of a laser beam from the laser beam generator 331. Usual laser beam application conditions are YAG-UV (yttrium aluminum garnet crystal, wavelength 266 nm) pulse laser beam, oscillation frequency 5000 Hz, beam diameter 20 µm, and output 300 mW. When the portion of the scintillator panel 10 illuminated with the laser beam has been cut, the scintillator panel 10 is moved by the support table moving unit (not shown) to slide the laser beam illumination position and another portion of the scintillator panel 10 is cut. These operations are repeated to cut the entire scintillator panel to desired shapes.

The laser beam used in the cutting of the inventive scintillator panels is desirably an ultraviolet laser beam having a wavelength of about 266 nm such as one described above. A laser beam having a wavelength of about 266 nm is capable of machining the workpiece by the heating action as well as dissociating molecular bonds in organic materials such as C—H bonds and C—C bonds. That is, when the support is, for example, a resin film such as a polyimide film, cutting of such a scintillator panel takes place in such a manner that the scintillator layer is cut by the heating action while the support comprised of a resin film such as a polyimide film is cut by the dissociation of molecular bonds. Thus, the resin film as the support is not thermally deformed. Consequently, no stress will be applied to the joint between the deposition substrate and the scintillator layer, and the occurrence of crystal breakage at the cut can be prevented. Laser cutting may be suitably adopted particularly when the support of the scintillator panel is a resin film.

4-6. Methods for Forming Protective Layers in Scintillator Panels

A protective layer may be provided in the scintillator panel. The protective layer may be formed by directly coating the surface of the scintillator layer with a protective coating liquid including the aforementioned materials for the protective layer, or may be provided by stacking or bonding via an adhesive a separately prepared protective layer onto the phosphor layer. Alternatively, the materials for the protective layer may be deposited onto the scintillator panel to form the protective layer.

Compact detectors such as dental detectors used for oral radiography require washing or alcohol disinfection as a whole including the housings due to their use in the mouth.

Thus, the housings themselves have high moisture proofness. The protective layers in the scintillator panels are not necessarily required in such cases.

When the protective layer is provided in the inventive scintillator panel, it is preferable to form the protective layer such that the entire surface of the scintillator layer and a portion of the reflective layer are covered with the continuous protective layer. From viewpoints such as easy production and easy processing of the film, it is particularly preferable that polyparaxylylene be deposited by a chemical vapor deposition (CVD) method to form a polyparaxylylene film as the protective layer on the scintillator panel.

Further, a polyparaxylylene film as the protective layer may be advantageously formed on the scintillator panel such that the surface roughness (Ra) will be 0.5 µm to 5.0 µm. In an embodiment in which the scintillator panel is coupled to a light-receiving element, this configuration makes it possible to effectively prevent the optical diffusion of light due to regular reflection and total reflection by the plane of the scintillator and the plane of the light-receiving element.

Figure 10:
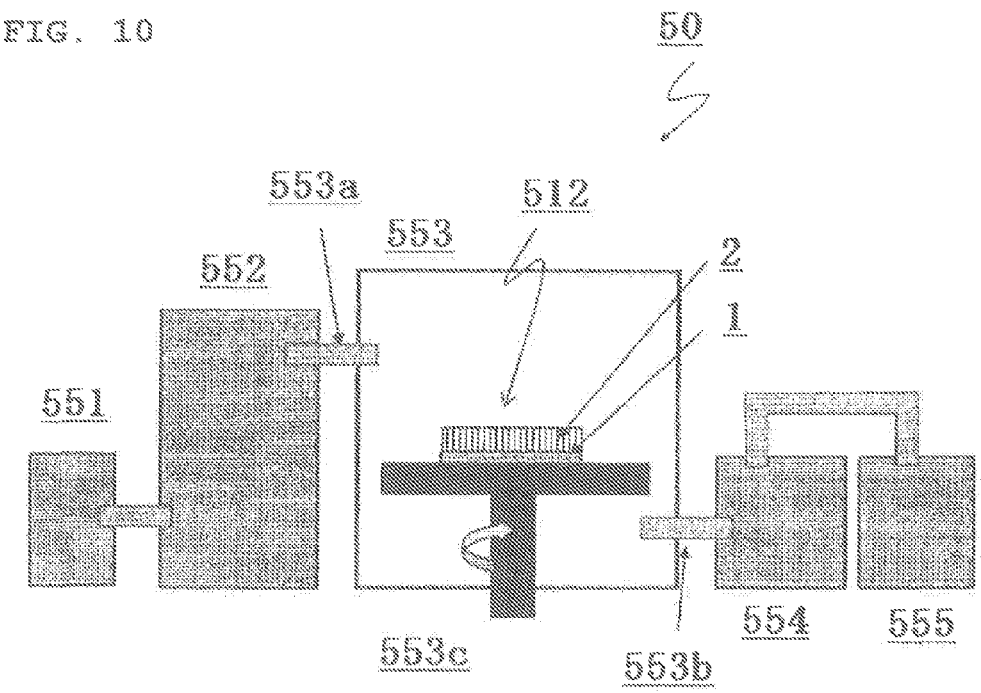
FIG. 10 is a schematic view illustrating a typical example of methods for forming a polyparaxylylene protective film on the surface of a scintillator layer of a scintillator panel.

FIG. 10 illustrates an example of the formation of a polyparazylylene film as the protective layer on the surface of a phosphor layer 2 of a scintillator panel 10.

A CVD apparatus 50 includes a vaporization chamber 551 into which diparaxylylene that is the raw material for the polyparazylylene is fed and vaporized, a pyrolysis chamber 552 in which the vaporized diparaxylylene is heated and converted into radicals, a deposition chamber 553 in which the radicals of diparaxylylene are deposited onto the scintillator panel 10 having a scintillator, a cooling chamber 554 for performing deodorization and cooling, and an evacuation system 555 having a vacuum pump. Here, as illustrated in FIG. 10, the deposition chamber 553 has an inlet 553a through which the radicals of diparaxylylene from the pyrolysis chamber 552 are introduced, an outlet 553b through which excess polyparaxylylene is discharged, and a turntable (a deposition table) 553c configured to support the workpiece during the deposition of the polyparaxylylene film.

The scintillator panel 10 is placed on the turntable 553c in the deposition chamber 553 such that the scintillator layer 2 comes upward. Next, the radicals of diparaxylylene generated by vaporization at 175° C. in the vaporization chamber 551 and heating at 690° C. in the pyrolysis chamber 552 are introduced through the inlet 553a into the deposition chamber 553 and are deposited in a thickness of 2 to 15 µm to form a protective layer (a polyparaxylylene film) for the scintillator layer 2. Here, the inside of the deposition chamber 553 is maintained at a vacuum degree of, for example, 1 to 100 Pa, (preferably 13 Pa). The turntable 553c is rotated at a speed of, for example, 0.5 to rpm (preferably 4 rpm). The excess polyparaxylylene is discharged through the outlet 553b to the cooling chamber 554 for performing deodorization and cooling, and the evacuation system 555 having a vacuum pump.

In another embodiment, a hot melt resin may be used as the material for the protective layer. The hot melt resin may also serve as an adhesive for bonding the scintillator panel to the surface of a planar light-receiving element.

The protective layer of a hot melt resin may be formed by any of the following methods which are described as examples.

A release sheet coated with a releasing agent is provided, and a hot melt resin is applied onto the release sheet. The side coated with the hot melt resin is arranged on the surface of the phosphor layer of the scintillator panel, and the layers are bonded to each other under the application of a pressure with a hot roller. After cooling, the release sheet is removed. In another method, the sheet coated with a hot melt resin is arranged on the surface of the scintillator layer, and resin films are arranged on respective other surfaces (meaning not in contact with each other) of the hot melt resin-coated sheet and the scintillator layer. After the peripheral portions of the resin films are sealed (tightly closed) under a reduced pressure, the assembly is heat treated at atmospheric pressure.

In the latter method, the resin films are suitably sealant films or polyethylene terephthalate (PET) dry laminate films. Such films are more advantageous in that uniform bond pressure by atmospheric pressure is obtained in the entire plane of contact between the hot melt resin and the scintillator layer.

When the protective layer is disposed on the scintillator panel, a layer including an inorganic substance such as SiC, $SiO_2$, SiN or $Al_2O_3$ may be stacked on the protective layer by a method such as deposition or sputtering.

Since the performances of the scintillator panels are evaluated with respect to radiographic image detectors in which units of the scintillator panels and light-receiving elements described later have been incorporated, the evaluation of such performances will be discussed in detail after the radiographic image detectors are described.

5. Evaluation and Use Application of Deposition Substrates and Scintillator Panels In the deposition substrates of the invention, the reflective layer includes the binder resin with a specific Tg and has a specific thickness, and the deposition substrates thus exhibit excellent cuttability. Further, the deposition substrates realize scintillator panels which can give radiographic images with excellent sensitivity and sharpness and which exhibit excellent cuttability. With these characteristics, the deposition substrates are suitably used in applications such as scintillator panels (for radiographic detectors).

The scintillator panels of the invention can give radiographic images such as X-ray images with excellent sensitivity and sharpness, and exhibit excellent cuttability. With these characteristics, for example, the scintillator panels may be suitably coupled to light-receiving elements for use in applications such as radiographic image detectors.

As mentioned above, the deposition substrates of the invention may be used in scintillator panel applications. Further, as will be described below, the scintillator panels of the invention may be coupled to light-receiving elements for use in radiographic image detector applications. Furthermore, the methods for evaluating the performances of the scintillator panels with respect to radiographic image detectors will be described below.

5-1. Radiographic Image Detectors 5-1-1. Coupling of Scintillator Panels to Light-Receiving Elements The scintillator panel of the invention may be coupled to a light-receiving element which has a plurality of two-dimensionally arranged light-receiving pixels and is configured to convert light produced in the scintillator panel into electricity.

The light-receiving element may have a film which separates the light-receiving element from the scintillator panel. Hereinafter, light-receiving elements having such films and light-receiving elements having no such films will be collectively referred to as "light-receiving elements".

The scintillator panel of the invention is preferably coupled to a planar light-receiving element by a coupling method which can suppress deteriorations in the sharpness of the obtainable radiographic images due to optical diffusion at the plane of contact. A general method for coupling the scintillator panel to the planar light-receiving element is to bring the scintillator surface of the scintillator panel and the surface of the light-receiving element into intimate contact together by any pressing technique, or to couple the two components with a jointing agent, for example, an adhesive or an optical oil, which has an intermediate refractive index between the refractive index of the scintillator of the scintillator panel and the refractive index of the light-receiving section of the planar light-receiving element. (In the case where a protective layer is disposed on the scintillator layer of the scintillator panel, the "scintillator surface" will be appropriately interpreted as the "surface of the protective layer" unless otherwise mentioned. The same applies hereinafter.)

Examples of the adhesives for coupling the scintillator surface of the scintillator panel to the surface of the light-receiving element include room-temperature vulcanizing (RTV) adhesives such as acrylic adhesives, epoxy adhesives and silicone adhesives. In particular, examples of elastic adhesive resins include rubber adhesives. Exemplary resins of the rubber adhesives include block copolymers such as styrene isoprene styrene, synthetic rubbers such as polybutadiene and polybutylene, and natural rubbers. Suitable examples of commercially available rubber adhesives include one-pert RTV rubber KE420 (manufactured by Shin-Etsu Chemical Co., Ltd.). Examples of the silicone adhesives include silicone adhesives of peroxide-crosslinking type or addition condensation type. These adhesives may be used singly or as a mixture. Further, the adhesives may be mixed together with acrylic or rubber-based pressure-sensitive adhesives. Furthermore, adhesives may be used in which silicone components have been introduced as pendant groups to the polymer main chain or side chains of acrylic adhesives.

Optical greases are also usable. Further, other materials such as optical oils which exhibit tackiness with respect to the scintillator panels and the light-receiving elements are also usable. Any known optical oils having tackiness and high transparency may be used. Suitable examples of commercially available optical oils include KF96H (1000000 CS, manufactured by Shin-Etsu Chemical Co., Ltd.) and Cargille Immersion Oil Type 37 (manufactured by Cargille Laboratories, Inc., refractive index fluid). Any known optical greases having tackiness and high transparency may be used. Suitable examples of commercially available optical greases include silicone oil KF96H (1000000 CS, manufactured by Shin-Etsu Chemical Co., Ltd.).

When the scintillator panel is coupled to the light-receiving element via an adhesive, a pressure of 10 to 10,000 gf/cm$^2$, and more preferably 10 to 500 gf/cm$^2$ is applied until the adhesive solidifies. By the application of pressure, air bubbles are removed from the adhesive layer. In the case where a hot melt resin has been used as the protective layer, the scintillator panel and the light-receiving element are placed in contact with each other, and, under a pressure of 10 to 10,000 gf/cm$^2$, are heated to a temperature that is 10° C. or more higher than the melting onset temperature of the hot melt resin, then allowed to stand for 1 to 2 hours, and gradually cooled. Quenching tends to result in damages to the light-receiving element due to the stress of shrinkage of the hot melt resin. Preferably, the temperature is cooled to 50° C. or below at a rate of not more than 20° C./hour.

Of the above methods, however, the method of bringing the surfaces into intimate contact together by any pressing technique has an inconvenience in that the light emitted from the scintillator panel inevitably causes unfavorable effects by being scattered in the gap (the air layer) at the joint between the scintillator surface of the scintillator panel and the surface of the light-receiving element.

Even when the other method is adopted by coupling the scintillator panel and the light-receiving element via a jointing agent having an intermediate refractive index between the scintillator of the scintillator panel and the light-receiving element, it is difficult to equate all the refractive indexes of the scintillator of the scintillator panel, the jointing agent and the light-receiving element, with the result that light is scattered at the interface between the scintillator and the jointing agent and at the interface between the jointing agent and the light-receiving element. The scattering of light emitted from the scintillator panel deteriorates the sharpness of the obtainable radiographic images (but the objects of the invention are still achieved).

These problematic deteriorations in the sharpness of radiographic images may be remedied by subjecting the scintillator surface of the scintillator panel and the surface of the light-receiving element to an anti-scattering treatment, for example, by providing an anti-optical diffusion layer on the scintillator surface of the scintillator panel, by providing an antireflection layer on at least one of the scintillator surface of the scintillator panel and the surface of the light-receiving element, or by controlling the surface roughness (Ra) of either or both of the opposed surfaces, namely, the scintillator surface and the surface of the light-receiving element to 0.5 μm to 5.0 μm. The implementation of the above known coupling method in combination with any of these anti-scattering treatments makes it possible to effectively prevent the scattering of light and to obtain radiographic images with excellent sharpness and excellent uniformity of sharpness.

Here, the anti-optical diffusion layer is a layer which has an optical transmittance of 60% to 99% with respect to 550 nm wavelength light and is disposed on the scintillator panel to serve also as a protective layer. This layer has a function to attenuate the intensity of light propagating through the protective layer (the anti-optical diffusion layer). While the intensity of the light emitted from the scintillator toward the light-receiving element is not substantially decreased because the optical path of such light in the anti-optical diffusion layer is sufficiently short, the anti-optical diffusion layer effectively removes scattered light traveling a long optical path within the anti-optical diffusion layer at an angle nearly parallel to the surface of the light-receiving element.

The antireflection layer prevents a phenomenon in which the light emitted from the scintillator of the scintillator panel is repeatedly reflected and propagated between the scintillator surface of the scintillator panel and the surface of the light-receiving element, and consequently prevents a failure of the light to be detected by the light-receiving element. The antireflection layer is a resin layer having a lower refractive index than the scintillator when it is disposed on the scintillator surface, and is a resin layer having a lower refractive index than the light-receiving element when it is disposed on the surface of the light-receiving element. By providing such an antireflection layer on at least one of the scintillator surface of the scintillator panel and the surface of the light-receiving element, the emitted light is allowed to be propagated in the antireflection layer at an angle smaller than the angle of incident from the scintillator side and to be propagated to the light-receiving element at an angle larger than the above angle, thereby preventing repeated reflection of the emitted light between the scintillator surface and the surface of the light-receiving element. More preferably, the antireflection layer is designed such that its optical transmittance with respect to 550 nm wavelength light will be 60% to 99% in order to add effects similar to those obtained with the aforementioned protective layer serving also as the anti-optical diffusion layer.

Further, controlling the surface roughness (Pa) of either or both of the opposed surfaces of the scintillator and of the light-receiving element to 0.5 μm to 5.0 μm suppresses the occurrence of regular reflection and total reflection by irregularities in the light incidence plane. As a result, it becomes possible to effectively prevent the optical diffusion of the light emitted from the scintillator between the scintillator surface and the surface of the light-receiving element.

In order to obtain combined effects in the prevention of optical diffusion, it is more preferable that the anti-optical diffusion layer and the antireflection layer disposed on the scintillator surface and the surface of the light-receiving element be treated such that the arithmetic average surface roughness of their planes (surfaces) placed in contact with the surface of the scintillator panel or the light-receiving element will be 0.5 μm to 5.0 μm.

Examples of the anti-optical diffusion layers and the antireflection layers include layers containing materials such as polyparaxylylenes, polyurethanes, vinyl chloride copolymers, vinyl chloride vinyl acetate copolymers, vinyl chloride vinylidene chloride copolymers, vinyl chloride acrylonitrile copolymers, butadiene acrylonitrile copolymers, polyamide resins, polyvinyl butyrals, polyester resins, cellulose derivatives (such as nitrocellulose), styrene butadiene copolymers, various synthetic rubber resins, phenolic resins, epoxy resins, urea resins, melamine resins, phenoxy resins, silicone resins, acrylic resins and urea formamide resins. These materials may be used singly, or two or more may be mixed together. The anti-optical diffusion layer and the antireflection layer are preferably polyparaxylylene films formed by, in particular, a chemical vapor deposition (CVD) method from viewpoints such as that such layers may be easily formed on the scintillator surface of the scintillator panel or the surface of the light-receiving element, and that such layers also have a function as protective layers for the scintillator. (In this case, a separate protective layer is not necessarily provided because the polyparaxylylene film serves as a protective layer, an anti-optical diffusion layer and an antireflection layer.)

When the optical transmittance of the anti-optical diffusion layer is adjusted by the addition of a coloring material, a blue coloring material is preferably used from the viewpoint that the blue coloring materials absorb long-wavelength red light which is more prone to scatter than other wavelength light. Examples of the blue coloring materials include ultramarine blue, Prussian blue (iron ferrocyanide), phthalocyanine, anthraquinone, indigoid and carbonium.

5-1-2. Radiographic Image Detectors Including Imaging Panels Incorporating Scintillator Panels Coupled with Light-Receiving Elements Hereinbelow, an example of the applications of the inventive scintillator panels will be described with reference to FIGS. 4 and 5 illustrating a radiographic image detector 100 including a radiographic scintillator panel 10.

In the radiographic image detector 100, the scintillator panel coupled with a light-receiving element is incorporated in an imaging panel.

Figure 4:
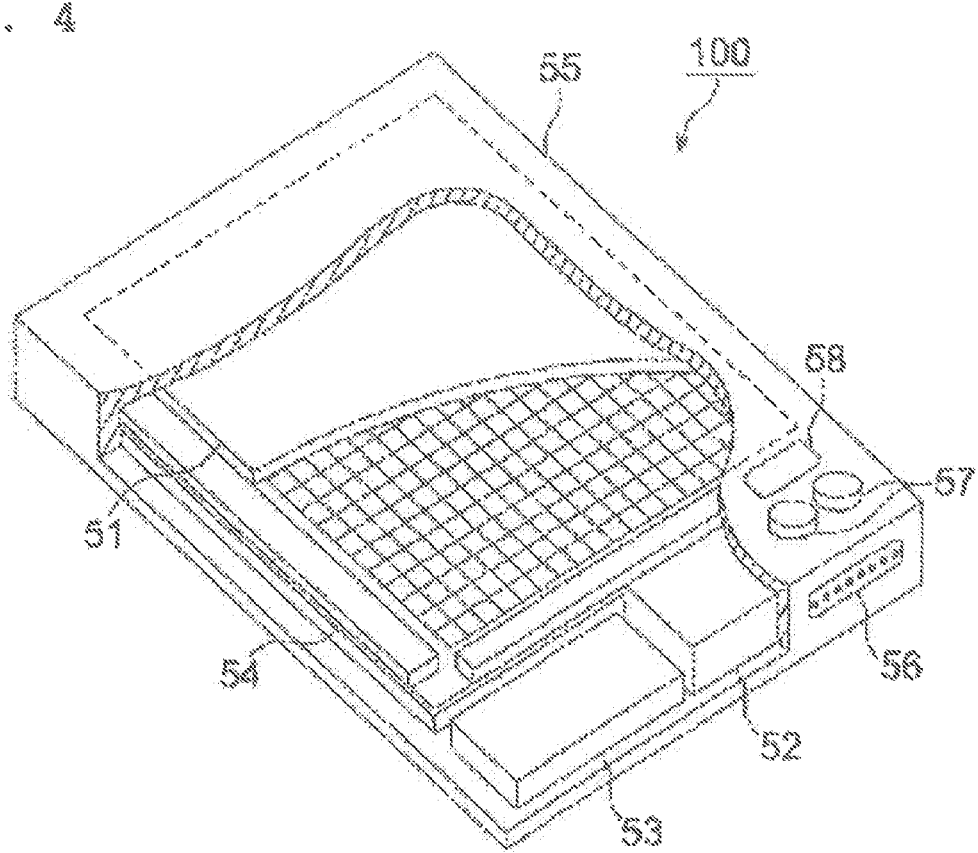
FIG. 4 is a partially broken schematic perspective view illustrating a configuration of a radiographic image detector 100 as an example of radiographic image detectors.
Figure 5:
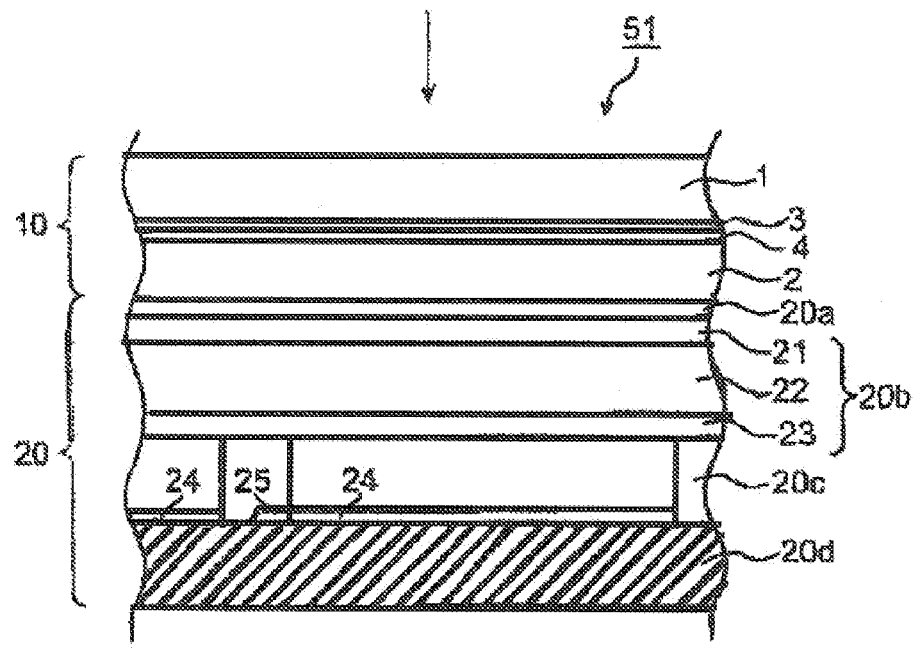
FIG. 5 is an enlarged sectional view of an imaging panel 51 as an example of imaging panels.
Figure 6:
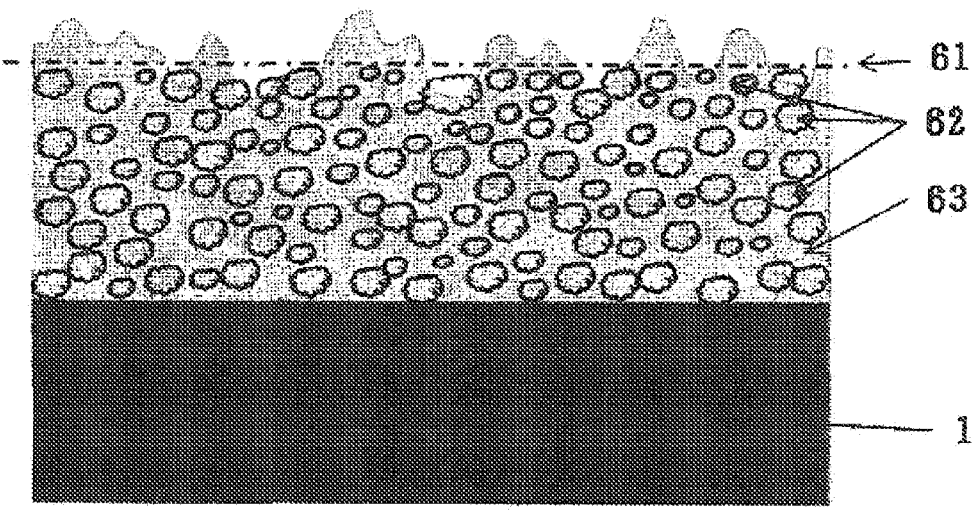
FIG. 6 is a sectional view illustrating an example of deposition substrates of the invention, wherein there are shown materials and a middle line (JIS B 0601-2001) at half the height of surface roughness on a scintillator layer formation scheduled surface of a reflective layer (the surface of the reflective layer opposite to the surface in contact with a support).

FIG. 4 is a partially broken schematic perspective view illustrating a configuration of the radiographic image detector 100. FIG. 5 is an enlarged sectional view of the imaging panel 51.

As illustrated in FIG. 4, the radiographic image detector 100 includes the imaging panel 51, a control section 52 configured to control the operations of the radiographic image detector 100, a memory section 53 configured to store image signals output from the imaging panel 51 in a medium such as a rewritable special memory (for example, a flash memory), and a power supply section 54 that supplies electrical power required to drive the imaging panel 51 and to acquire image signals. These and other components are accommodated in a housing 55. The housing 55 is provided with a communication connector 56 for establishing a communication between the radiographic image detector 100 and an external device as required, an operation section 57 for switching the operations of the radiographic image detector 100, and a display section 58 configured to display messages such as that the radiographic image detector is ready for imaging, or that the memory section 53 has stored a predetermined volume of image signals.

The radiographic image detector 100 including the power supply section 54 and the memory section 53 capable of storing radiographic image signals may be detachably connected via the connector 56 to a computer to which the images will be forwarded. According to this configuration, the radiographic image detector 100 does not have to be located at a fixed position with the computer and may be transported from one place to another.

As illustrated in FIG. 5, the imaging panel 51 includes the radiographic scintillator panel 10, and an output substrate 20 that absorbs electromagnetic waves from the radiographic scintillator panel 10 and outputs the image signals.

In the imaging panel 51, the radiographic scintillator panel 10 is arranged such that the scintillator layer is in contact with the light-receiving element, and is configured to emit electromagnetic waves corresponding to the intensities of the incident radiations.

The output substrate 20 is disposed opposite to the radiation-illuminated side of the radiographic scintillator panel 10, and includes a separator film 20a, the light-receiving element 20b, an image signal output layer 20c, and a base 20d sequentially in the order of increasing distance from the radiographic scintillator panel 10.

The separator film 20a separates the radiographic scintillator panel 10 and the adjacent layers (in the imaging panel 51, the output substrate 20).

The light-receiving element 20b includes a transparent electrode 21, a charge generation layer 22 that generates electric charges by being excited by the electromagnetic waves incident thereon through the transparent electrode 21, and a counter electrode 23 that makes a pair with the transparent electrode 21. These are disposed in the order of the transparent electrode 21, the charge generation layer 22 and the counter electrode 23 as viewed from the separator film 20a side.

The transparent electrode 21 is capable of transmitting electromagnetic waves which are to be photoelectric converted and is made of, for example, a conductive transparent material such as indium tin oxide (ITO), $SnO_2$ or ZnO.

The charge generation layer 22 is disposed in the form of a thin film on the surface of the transparent electrode 21 opposite to the surface in contact with the separator film 20a. The charge generation layer 22 includes photoelectric conversion compounds, namely, organic compounds that undergo charge separation when illuminated with light. The organic compounds which produce charge separation are a conductive compound serving as an electron donor by donating electric charges, and another conductive compound serving as an electron acceptor. When electromagnetic waves such as radiations are incident on the charge generation layer 22, the electron donor is excited to release electrons, and the released electrons are transferred to the electron acceptor. In this manner, charges, namely, hole and electron carriers are generated in the charge generation layer 22.

Examples of the conductive compounds as the electron donors include p-type conductive polymer compounds. Preferred p-type conductive polymer compounds are those compounds having a basic skeleton of polyphenylene vinylene, polythiophene, poly(thiophene vinylene), polyacetylene, polypyrrole, polyfluorene, poly(p-phenylene) or polyaniline.

Examples of the conductive compounds as the electron acceptors include n-type conductive polymer compounds. Preferred n-type conductive polymer compounds are those compounds having a basic skeleton of polypyridine, and particularly preferred compounds are those having a basic skeleton of poly(p-pyridyl vinylene).

The thickness of the charge generation layer 22 is preferably not less than 10 nm (particularly not less than 100 nm) in order to ensure a sufficient amount of optical absorption, and is preferably not more than 1 μm (particularly not more than 300 nm) in order to avoid an excessively high electric resistance.

The counter electrode 23 is disposed on the surface of the charge generation layer 22 opposite to the surface on which the electromagnetic waves (the light emitted from the scintillator layer 2 of the radiographic scintillator panel 10) are incident. For example, the counter electrode 23 may be selected from general metal electrodes such as gold, silver, aluminum and chromium as well as from transparent electrodes similar to the transparent electrode 21. In order to achieve good characteristics, the electrode is preferably formed from a material with a low work function (not more than 4.5 eV) selected from metals, alloys, electrical conductive compounds and mixtures of these substances.

Between the charge generation layer 22 and each of the electrodes (the transparent electrode 21 and the counter electrode 23), a buffer layer may be disposed which serves as a buffer zone preventing the reaction between the charge generation layer 22 and the electrodes. For example, the buffer layers may be formed using such materials as lithium fluoride, and poly(3,4-ethylenedioxythiophene):poly(4-styrene sulfonate) or 2,9-dimethyl-4,7-diphenyl[1,10]phenanthroline.

The image signal output layer 20c stores the charges generated in the light-receiving element 20b, and outputs signals based on the stored charges. This layer is comprised of capacitors 24 that are charge storage elements for storing the charges generated in the light-receiving element 20b with respect to each pixel, and transistors 25 that are image signal output elements outputting the stored charges as signals.

Examples of the transistors 25 include thin film transistors (TFTs). The TFTs may be inorganic semiconductor TFTs utilized in devices such as liquid crystal displays or may be organic semiconductor TFTs. TFTs formed on plastic films are preferable. Examples of the TFTs formed on plastic films include amorphous silicon semiconductor TFTs on plastic films, and TFTs obtained utilizing the fluidic self assembly (FSA) technology developed by Alien Technology Corp., USA, specifically, TFTs on flexible plastic films obtained by arranging fine single crystal silicon CMOS (Nanoblocks) on embossed plastic films. Further, TFTs including organic semiconductors described in literature such as Science, 283, 822 (1999), Appl. Phys. Lett., 771488 (1998), and Nature, 403, 521 (2000) may be utilized.

The transistors 25 used in the invention are preferably TFTs fabricated by the FSA technology or organic semiconductor TFTs, and are particularly preferably organic semiconductor TFTs. The fabrication of organic semiconductor TFTs does not entail large facilities such as vacuum deposition apparatuses in contrast to silicon TFTs, and may be accomplished at low costs by utilizing a printing technology or an inkjet technology. Further, organic semiconductor TFTs allow the processing temperature to be decreased, and thus may be formed on heat-labile plastic substrates.

To the transistor 25 are electrically connected the capacitor 24 for storing the charges generated in the light-receiving element 20b, and a collector electrode (not shown) serving as one of the electrodes of the capacitor 24. The capacitor 24 stores the charges generated in the light-receiving element 20b, and the stored charges are read out by the driving of the transistor 25. That is, the signals of the respective pixels for the radiographic image may be output by the driving of the transistors 25.

The base 20d serves as a support of the imaging panel 51, and may be comprised of a material similar to the support 1.

Next, there will be described the mechanism in which the radiographic image detector 100 detects a radiographic image.

First, the radiographic image detector 100 is illuminated with radiations such as X-rays incident from the radiographic scintillator panel 10 side toward the base 20d side of the imaging panel 51.

The radiations incident on the radiographic image detector 100 are absorbed as radiation energy by the scintillator layer 2 of the radiographic scintillator panel 10 in the radiographic image detector 100. The radiations are then converted into visible light in the scintillator layer 2, and the visible light (electromagnetic waves) corresponding to the intensities of the radiations is emitted from the scintillator layer 2. A portion of the emitted visible light (electromagnetic waves) enters the output substrate 20 and reaches the charge generation layer 22 through the separator film 20a and the transparent electrode 21 of the output substrate 20. The visible light (electromagnetic waves) is absorbed in the charge generation layer 22, and hole-electron pairs (charge separation) are formed in accordance with the intensities of the absorbed visible light (electromagnetic waves).

The holes and the electrons generated in the charge generation layer 22 are transported to the respective electrodes (the transparent electrode 21 and the counter electrode 23) by the action of an internal electric field produced by the application of bias voltage from the power supply section 54, resulting in the passage of photocurrent.

The holes transported to the counter electrode 23 side are stored in the capacitors 24 of the image signal output layer 20c. When the transistors 25 connected to the capacitors 24 are driven, the stored holes are output as image signals, which are then stored in the memory section 53.

Because of the incorporation of the radiographic scintillator panel 10, the radiographic image detector 100 achieves a high photoelectric conversion efficiency and an improved S/N ratio during low-dose imaging of radiographic images, and can eliminate (or reduce) image unevenness and linear noise.

5-3. Methods for Evaluating Performances of Deposition Substrates and Scintillator Panels 5-3-1. Method for Evaluating Cuttability of Deposition Substrate The cuttability of the deposition substrate is evaluated in accordance with the evaluation method described later in EXAMPLES.

First, the deposition substrate is cut with a force-cutting blade, and the length of separation of the reflective layer from the support is measured with an optical microscope. The cuttability of the deposition substrate is evaluated based on the following criteria. The cuttability is evaluated to be acceptable for product performance when the length of separation of the reflective layer is 100 μm or less.

TABLE 1

| | |
|---|---|
| ⊙ | Not more than 10 μm |
| ○ | More than 10 μm to not more than 50 μm |

TABLE 1-continued

| | |
|---|---|
| Δ | More than 50 μm to not more than 100 μm |
| X | More than 100 μm |

5-3-2. Method for Evaluating Cuttability of Scintillator Panel

The cuttability of the scintillator panel is evaluated in accordance with the evaluation method described later in EXAMPLES.

First, the scintillator panel is cut with a force-cutting blade, and the length of separation of the scintillator layer from the reflective layer is measured with an optical microscope. The cuttability of the scintillator panel is evaluated based on the following criteria. The cuttability is evaluated to be acceptable for product performance when the length of separation of the scintillator layer is 100 μm or less.

TABLE 2

| | |
|---|---|
| ⊙ | Not more than 10 μm |
| ○ | More than 10 μm to not more than 50 μm |
| Δ | More than 50 μm to not more than 100 μm |
| X | More than 100 μm |

5-4-3. Method for Evaluating Sensitivity (Brightness) of Scintillator Panel

The sensitivity (brightness) of the scintillator panel is evaluated in accordance with the evaluation method described later in EXAMPLES.

With an X-ray illuminator having a tube voltage of 80 kVp, X-rays are applied to the light-receiving plane of a FPD including the radiographic image detector. The obtained X-ray image data is analyzed to determine the average signal value of the entirety of the X-ray image, thereby evaluating the sensitivity of the scintillator panel. The average signal value of the radiographic image detector including the scintillator panel No. 1 is taken as 100.

5-3-4. Method for Evaluating Sharpness of Scintillator Panel

With an X-ray illuminator having a tube voltage of 80 kVp, X-rays are applied to the backside (the surface without the scintillator layer) of the scintillator panel through a lead MTF chart, and the image data detected at a CMOS flat panel is recorded on a hard disk. Thereafter, the image data recorded on the hard disk is analyzed with a computer to determine the MTF value (at a spatial frequency of 1 cycle/mm) of the X-ray image recorded on the hard disk, as the indicator of sharpness. A larger value of MTF, which is an abbreviation for modulation transfer function, indicates higher sharpness of the X-ray image.

EXAMPLES

The present invention will be described in detail based on examples hereinbelow without limiting the scope of the invention.

Hereinafter, the term "average particle diameter" indicates "area average particle diameter".

1. Fabrication of Deposition Substrates

Example 1

Deposition Substrate No. 1

40 Parts by mass in total of rutile-form titanium dioxide (CR93 manufactured by ISHIHARA SANGYO KAISHA, LTD., average particle diameter 0.28 μm) as light-scattering particles and a polyester resin (VYLON 550 manufactured by TOYOBO CO., LTD., Tg: −15° C.) as a binder resin, and 30 parts by mass of cyclohexanone and 30 parts by mass of methyl ethyl ketone (MEK) as solvents were mixed together. The mixture was dispersed with a sand mill to give a first resin coating liquid (a reflective coating liquid 1). The light-scattering particles and the binder resin were used in a solid content ratio (vol %) of 20/80. The first resin coating liquid was applied onto a 500 mm wide polyimide film support (UPILEX S manufactured by UBE INDUSTRIES, LTD., 125 μm thick) with a comma coater. The first resin coating liquid was then dried at 180° C. for 3 minutes to form a resin layer on the support. Thus, a deposition substrate No. 1 was fabricated which included the support and the reflective layer described in Table 5.

Examples 2 to 4 and Comparative Example 1

Fabrication of Deposition Substrates Nos. 2 to 5

Deposition substrates Nos. 2 to 5 with the thicknesses described in Table 5 were fabricated in the same manner as in EXAMPLE 1, except that the binder in EXAMPLE 1 was changed as described in Table 5.

Comparative Example 2, Examples 5 and 6, and Comparative Example 3

Fabrication of Deposition Substrates Nos. 6 to 9

Deposition substrates Nos. 6 to 9 with the thicknesses described in Table 5 were fabricated in the same manner as in EXAMPLE 2, except that the thickness of the reflective layer in EXAMPLE 2 was changed as described in Table 5.

Example 7

Fabrication of Deposition Substrate No. 10

A deposition substrate No. 10 with the thickness described in Table 5 was fabricated in the same manner as in EXAMPLE 2, except that the type of light-scattering particles in EXAMPLE 2 was changed to hollow particles (SX866 manufactured by JSR Corporation, average particle diameter 0.3 μm).

Example 8

Fabrication of Deposition Substrate No. 11

A deposition substrate No. 11 with the thickness described in Table 5 was fabricated in the same manner as in EXAMPLE 2, except that the light-scattering particles/binder resin ratio in EXAMPLE 2 was changed as described in Table 5.

Comparative Example 4

Fabrication of Deposition Substrate No. 12

A deposition substrate No. 12 with the thickness described in Table 5 was fabricated in the same manner as in EXAMPLE 2, except that the light-scattering particles/binder resin ratio in EXAMPLE 2 was changed as described in Table 5.

Example 9

Fabrication of Deposition Substrate No. 13

A deposition substrate No. 13 with the thickness described in Table 5 was fabricated in the same manner as in EXAMPLE 2, except that the time of drying after the application in EXAMPLE 2 was reduced to 2 minutes.

Example 10

Fabrication of Deposition Substrate No. 14

A deposition substrate No. 14 with the thickness described in Table 5 was fabricated in the same manner as in EXAMPLE 2, except that the reflective coating liquid in EXAMPLE 2 was applied onto a 500 mm square aluminum support with a spin coater and the coating was dried at 180° C. for 5 minutes.

Examples 11 and 12

Fabrication of Deposition Substrates Nos. 15 and 16

Deposition substrates Nos. 15 and 16 with the thicknesses described in Table 5 were fabricated in the same manner as in EXAMPLE 10, except that the material of the support in EXAMPLE 10 was changed as described in Table 5.

Examples 13 and 14

Fabrication of Deposition Substrates Nos. 17 and 18

Deposition substrates Nos. 17 and 18 with the thicknesses described in Table 5 were fabricated in the same manner as in EXAMPLE 1, except that the resin of the reflective layer in EXAMPLE 1 was changed as described in Table 5.

The deposition substrates Nos. 1 to 4, 7, 8, 10, 11 and 13 to 18 represent examples, and the deposition substrates Nos. 5, 6, 9 and 12 represent comparative examples.

2. Evaluation of deposition substrates

The deposition substrates Nos. 1 to 13, 17 and 18 were cut with a force-cutting blade, and the deposition substrates Nos. 14 to 16 were cut with a dicing blade. The length of separation of the reflective layer from the support was measured with an optical microscope, and the cuttability of the deposition substrate was evaluated based on the following criteria. The cuttability was evaluated to be acceptable for product performance when the length of separation of the reflective layer was 100 μm or less.

TABLE 3

| | |
|---|---|
| ⊙ | Not more than 10 μm |
| ○ | More than 10 μm to not more than 50 μm |
| Δ | More than 50 μm to not more than 100 μm |
| X | More than 100 μm |

3. Fabrication of Scintillator Panels

Examples 15 to 28

Scintillator Panels Nos. 1 to 4, 7, 8, 10, 11 and 13 to 18, Respectively, and Comparative Examples 5 to 8: Scintillator Panels Nos. 5, 6, 9 and 12, Respectively (Formation of Scintillator Layer)

The deposition substrates Nos. 1 to 18 were each cut to a 400 mm square piece with a force-cutting blade or a dicing blade. Each piece was set to a substrate holder 85 of a deposition apparatus illustrated in FIG. 3, and a phosphor was deposited onto the scintillator layer formation scheduled surface of the reflective layer sample as described below. Thus, scintillator panels Nos. 1 to 18 were fabricated in which a scintillator (phosphor) layer was disposed on the reflective layer sample. (The scintillator panels Nos. 1 to 4, 7, 8, 10, 11 and 13 to 18 represent examples, and the scintillator panels Nos. 5, 6, 9 and 12 represent comparative examples.)

A phosphor raw material (CsI) was packed as a deposition material into resistance-heating crucibles, thus preparing deposition sources 88. The reflective layer sample (the deposition substrate) was placed onto the rotatable holder 85 such that the surface of the support of the reflective layer sample was in contact with the holder 85. The gap between the reflective layer sample (the deposition substrate) and the deposition sources 88 was adjusted to 400 mm.

Next, the deposition apparatus was evacuated, and the degree of vacuum in the deposition apparatus was adjusted to 0.5 Pa by introducing Ar gas. While rotating the reflective layer sample (the deposition substrate) together with the holder 85 at 10 rpm, the holder 85 was heated to maintain the temperature of the reflective layer sample (the deposition substrate) at 200° C.

Next, the resistance-heating crucibles (the deposition sources 88) were heated to allow the phosphor to be deposited on the scintillator layer formation scheduled surface of the reflective layer sample (the deposition substrate), thereby forming a scintillator layer. The deposition was terminated when the thickness of the scintillator layer became 500 μm. Thus, a scintillator panel was obtained in which the scintillator layer was formed in the prescribed thickness on the scintillator layer formation scheduled surface of the reflective layer sample (the deposition substrate).

Next, the scintillator panel was cut into four 130 mm square pieces with a force-cutting blade or a dicing blade.

Next, the scintillator panel which had been cut was placed into a deposition chamber of a CVD apparatus and was exposed to a vapor formed by the sublimation of a raw material for polyparazylylene. In this manner, scintillator panels Nos. 1 to 18 were obtained in which the surface of the phosphor layer was covered with a polyparaxylylene resin film with a thickness of 10 μm.

The scintillator panel No. 4 was subjected to the following pressure treatment.

A flat glass plate was placed in close contact with the surface of the scintillator layer of the scintillator panel, then resin films were arranged on and under the scintillator panel-glass assembly and the peripheries of the resin films were fusion bonded together in vacuum to seal the assembly; after the scintillator panel-glass assembly was sealed in the resin films, the scintillator panel in that state was heat treated at 100° C. for 1 hour.

4. Evaluation of Scintillator Panels

The obtained samples were each set to a CMOS flat panel (X-ray CMOS camera system Shad-o-Box 4KEV manufactured by Teledyne Rad-icon Imaging Corporation). With the obtained 12 bit output data, the sharpness of the X-ray image obtained via the scintillator flat panel was measured by the following method. The measured sharpness was evaluated by the method described below.

Sponge sheets were applied to the carbon plate of the radiation incident window of the CMOS flat panel as well as to the radiation incident side (the side without the scintillator layer) of the scintillator panel, and the surface of the scintillator panel and the surface of the planar light-receiving element disposed in the CMOS flat panel were lightly pressed against each other to fix the scintillator panel to the planar light-receiving element.

(Method for Evaluating Sensitivity of Scintillator Panel)

With an X-ray illuminator having a tube voltage of 80 kVp, X-rays were applied to the light-receiving plane of a FPD including the radiographic image detector. The obtained X-ray image data was analyzed to determine the average signal value of the entirety of the X-ray image, thereby evaluating the sensitivity of the scintillator panel. The average signal value of the radiographic image detector including the scintillator panel No. 1 was taken as 100.

(Method for Evaluating Sharpness of Scintillator Panel)

With an X-ray illuminator having a tube voltage of 80 kVp, X-rays were applied to the backside (the surface without the scintillator layer) of the scintillator panel through a lead HTF chart, and the image data detected at the CMOS flat panel was recorded on a hard disk. Thereafter, the image data recorded on the hard disk was analyzed with a computer to determine the MTF value (at a spatial frequency of 1 cycle/mm) of the X-ray image recorded on the hard disk, as the indicator of sharpness. A larger value of MTF, which is an abbreviation for modulation transfer function, indicates higher sharpness of the X-ray image.

(Evaluation of Cuttability of Scintillator Panel)

The scintillator panels Nos. 1 to 18 were cut with a force-cutting blade or a dicing blade. The length of separation of the scintillator layer from the reflective layer was measured with an optical microscope, and the cuttability of the scintillator panel was evaluated based on the following criteria. The cuttability was evaluated to be acceptable for product performance when the length of separation of the scintillator layer was 100 μm or less.

TABLE 4

| | |
|---|---|
| ⊙ | Not more than 10 μm |
| ○ | More than 10 μm to not more than 50 μm |
| Δ | More than 50 μm to not more than 100 μm |
| X | More than 100 μm |

The evaluation results are described in Table 5.

TABLE 5-1

Configurations of deposition substrates used for fabrication of scintillator panels

| | Supports | | Reflective layers | | | | | Light-absorbing layers | | Deposition substrates | Scintillator panels |
|---|---|---|---|---|---|---|---|---|---|---|---|
| | | | | Resins*5 | | | | | | | |
| Nos.*1 | Materials Types | Thickness μm | LSP*3 Types | Types | Tg °C. | Ratio*4 vol %/vol % | Thickness μm | Presence or absence | | Volatile content mg/m² | Pressure treatment |
| 1 | Polyimide | 125 | TiO₂ | VYLON 550 | −15 | 40/60 | 50 | Present (PI) | | 0.2 | Not performed |
| 2 | Polyimide | 125 | TiO₂ | VYLON GK140 | 20 | 40/60 | 50 | Present (PI) | | 0.2 | Not performed |
| 3 | Polyimide | 125 | TiO₂ | VYLON GK600 | 47 | 40/60 | 50 | Present (PI) | | 0.2 | Not performed |
| 4 | Polyimide | 125 | TiO₂ | VYLON GK140 | 20 | 40/60 | 50 | Present (PI) | | 0.2 | performed |
| 5 | Polyimide | 125 | TiO₂ | VYLON 20SS | 67 | 40/60 | 50 | Present (PI) | | 0.2 | Not performed |
| 6 | Polyimide | 125 | TiO₂ | VYLON GK140 | 20 | 40/60 | 3 | Present (PI) | | 0.1 | Not performed |
| 7 | Polyimide | 125 | TiO₂ | VYLON GK140 | 20 | 40/60 | 10 | Present (PI) | | 0.1 | Not performed |
| 8 | Polyimide | 125 | TiO₂ | VYLON GK140 | 20 | 40/60 | 250 | Present (PI) | | 0.5 | Not performed |
| 9 | Polyimide | 125 | TiO₂ | VYLON GK140 | 20 | 40/60 | 350 | Present (PI) | | 0.9 | Not performed |
| 10 | Polyimide | 125 | Hollow particles | VYLON GK140 | 20 | 40/60 | 50 | Present (PI) | | 0.2 | Not performed |
| 11 | Polyimide | 125 | TiO₂ | VYLON GK140 | 20 | 15/85 | 50 | Present (PI) | | 0.2 | Not performed |
| 12 | Polyimide | 125 | — | VYLON GK140 | 20 | 0/100 | 50 | Present (PI) | | 0.2 | Not performed |
| 13 | Polyimide | 125 | TiO₂ | VYLON GK140 | 20 | 40/60 | 50 | Present (PI) | | 0.7 | Not performed |
| 14 | Aluminum | 500 | TiO₂ | VYLON GK140 | 20 | 15/85 | 50 | Absent | | 0.2 | Not performed |
| 15 | Glass | 500 | TiO₂ | VYLON GK140 | 20 | 15/85 | 50 | Absent | | 0.2 | Not performed |
| 16 | a-C*2 | 500 | TiO₂ | VYLON GK140 | 20 | 15/85 | 50 | Present (a-C) | | 0.2 | Not performed |
| 17 | Polyimide | 125 | TiO₂ | VYLON DR8700 | −22 | 40/60 | 50 | Present (PI) | | 0.2 | Not performed |
| 18 | Polyimide | 125 | TiO₂ | N-3022 | −38 | 40/60 | 50 | Present (PI) | | 0.2 | Not performed |

TABLE 5-2

Evaluations of deposition substrates and scintillator panels

| | Evaluations | | | | |
|---|---|---|---|---|---|
| | Cuttability | | | | |
| Nos. | Deposition substrates | Scintillator panels | Sensitivity | Sharpness | Remarks |
| 1 | ⊙ | ⊙ | 100 | 0.63 | EXAMPLES 1 and 15 |
| 2 | ⊙ | ⊙ | 102 | 0.64 | EXAMPLES 2 and 16 |
| 3 | ○ | ○ | 101 | 0.63 | EXAMPLES 3 and 17 |
| 4 | ⊙ | ⊙ | 102 | 0.67 | EXAMPLES 4 and 18 |
| 5 | X | X | 100 | 0.63 | COMPARATIVE EXAMPLES 1 and 5 |
| 6 | X | X | 76 | 0.68 | COMPARATIVE EXAMPLES 2 and 6 |
| 7 | ○ | ○ | 85 | 0.67 | EXAMPLES 5 and 19 |
| 8 | ⊙ | ⊙ | 106 | 0.55 | EXAMPLES 6 and 20 |
| 9 | ⊙ | ⊙ | 108 | 0.43 | COMPARATIVE EXAMPLES 3 and 7 |
| 10 | ⊙ | ⊙ | 82 | 0.61 | EXAMPLES 7 and 21 |
| 11 | ⊙ | ⊙ | 96 | 0.68 | EXAMPLES 8 and 22 |
| 12 | ⊙ | ⊙ | 53 | 0.71 | COMPARATIVE EXAMPLES 4 and 8 |
| 13 | ⊙ | ⊙ | 101 | 0.60 | EXAMPLES 9 and 23 |
| 14 | Δ | Δ | 97 | 0.57 | EXAMPLES 10 and 24 |
| 15 | Δ | Δ | 97 | 0.59 | EXAMPLES 11 and 25 |
| 16 | Δ | Δ | 95 | 0.67 | EXAMPLES 12 and 26 |

TABLE 5-2-continued

Evaluations of deposition substrates and scintillator panels

| | Evaluations | | | | |
|---|---|---|---|---|---|
| | Cuttability | | | | |
| Nos. | Deposition substrates | Scintillator panels | Sensitivity | Sharpness | Remarks |
| 17 | ⊙ | ⊙ | 99 | 0.61 | EXAMPLES 13 and 27 |
| 18 | ⊙ | ⊙ | 100 | 0.59 | EXAMPLES 14 and 28 |

*1: The numbers of the deposition substrates and the numbers of the scintillator panels (The numbers are common.)
*2: a-C = amorphous carbon
*3: LSP = light-scattering particles
*4: light-scattering particles/binder resin ratio
*5: VYLON 550, VYLON GK140, VYLON GK600 and VYLON 20SS: amorphous polyester resins manufactured by TOYOBO CO., LTD., VYLON UR8700: polyurethane resin manufactured by TOYOBO CO., LTD., N-3022: polyurethane resin manufactured by NIPPON POLYURETHAN INDUSTRY CO., LTD.
Notes:
The support made of polyimide (PI) or amorphous carbon also serves as a light-absorbing layer because PI or amorphous carbon is colored.

As clear from the results illustrated in Table 5, EXAMPLES in accordance with the invention achieved excellent cuttability without deteriorations in sharpness or sensitivity compared to COMPARATIVE EXAMPLES.

REFERENCE SIGNS LIST

10: SCINTILLATOR PANEL
1: SUPPORT
2: SCINTILLATOR LAYER
2a: COLUMNAR PHOSPHOR CRYSTAL
3: REFLECTIVE LAYER
61: MIDDLE LINE
62: LIGHT-SCATTERING PARTICLE
63: BINDER RESIN
81: DEPOSITION APPARATUS
82: VACUUM CONTAINER
83: VACUUM PUMP
84: DEPOSITION SUBSTRATE
85: HOLDER
86: ROTATING MECHANISM
87: ROTATING SHAFT
88 (88a and 88b): DEPOSITION SOURCES
89: SHUTTER
29: FEED STEP
39: APPLICATION STEP
49: DRYING STEP
59: HEAT TREATMENT STEP
69: RECOVERY STEP
79: DRYING STEP
109: PRODUCTION APPARATUS
201: SUPPORT
202: ROLL OF SUPPORT WOUND AROUND CORE
301: BACKUP ROLL
302: APPLICATION HEAD
303: VACUUM CHAMBER
304: APPLICATOR
401: DRYER
402: INLET
403: OUTLET
801: DRYER
802: INLET
803: OUTLET
501: HEAT TREATMENT APPARATUS
502: HEAT TREATMENT GAS INLET
503: OUTLET
601: RECOVERED ROLL OF SUPPORT WOUND AROUND CORE
a: CONVEYOR ROLL
b: CONVEYOR ROLL
c: CONVEYOR ROLL
d: CONVEYOR ROLL
32: DICING APPARATUS
221: GROOVE
321: BLADE
321a: ROTATIONAL SHAFT
322: DICING TABLE
323: NOZZLE
324: SUPPORT MEMBER
33: LASER CUTTING APPARATUS
331: LASER BEAM GENERATOR
332: SUPPORT TABLE
333: PURGE CHAMBER
334: DISCHARGE PIPE
335: TRANSLUCENT WINDOW
50: DEPOSITION APPARATUS
551: VAPORIZATION CHAMBER
552: PYROLYSIS CHAMBER
553: DEPOSITION CHAMBER
553a: INLET
553b: OUTLET
553c: TURNTABLE (DEPOSITION TABLE)
554: COOLING CHAMBER
555: EVACUATION SYSTEM
512: DEPOSITION OF PROTECTIVE LAYER (POLYPARAXYLYLENE FILM)
100: RADIOGRAPHIC IMAGE DETECTOR
51: IMAGING PANEL
52: CONTROL SECTION
53: MEMORY SECTION
54: POWER SUPPLY SECTION
55: HOUSING
56: CONNECTOR
57: OPERATION SECTION
58: DISPLAY SECTION
20: OUTPUT SUBSTRATE
20a: SEPARATOR FILM
20b: LIGHT-RECEIVING ELEMENT
20c: IMAGE SIGNAL OUTPUT LAYER
20d: BASE
21: TRANSPARENT ELECTRODE
22: CHARGE GENERATION LAYER
23: COUNTER ELECTRODE
24: CAPACITOR
25: TRANSISTOR

What is claimed is:

1. A deposition substrate comprising a support and a reflective layer disposed on the support,
   wherein the reflective layer includes light-scattering particles and a binder resin with a glass transition temperature of −100° C. to 60° C.,
   the thickness of the reflective layer is 5 to 300 μm, and
   the volatile content in the reflective layer is not more than 0.5 mg/m².

2. The deposition substrate according to claim 1, wherein the light-scattering particles include at least one selected from alumina, yttrium oxide, zirconium oxide, titanium dioxide, barium sulfate, silica, zinc oxide, calcium carbonate, glasses and resins.

3. The deposition substrate according to claim 1, wherein the light-scattering particles include at least one type of particles selected from hollow particles having a hollow portion within the particle, multi-hollow particles having a number of hollow portions within the particle, and porous particles.

4. The deposition substrate according to claim 1, wherein the light-scattering particles include at least titanium dioxide.

5. The deposition substrate according to claim 1, wherein the support includes a resin as a main component and the reflective layer is disposed on the support.

6. The deposition substrate according to claim 5, wherein the resin is polyimide.

7. The deposition substrate according to claim 1, further comprising a light-absorbing layer on the side opposite to a scintillator layer formation scheduled surface of the reflective layer.

8. A deposition substrate production method comprising forming a reflective layer including a binder resin on a support, and cutting the deposition substrate after the formation of the reflective layer.

9. The deposition substrate production method according to claim 8, wherein the glass transition temperature of the binder resin is −100 to 60° C., and
the thickness of the reflective layer is 5 to 300 μm.

10. A scintillator panel obtained by forming a scintillator layer by deposition on a scintillator layer formation scheduled surface of the deposition substrate described in claim 1.

11. The scintillator panel according to claim 10, wherein the light-scattering particles include at least one selected from alumina, yttrium oxide, zirconium oxide, titanium dioxide, barium sulfate, silica, zinc oxide, calcium carbonate, glasses and resins.

12. The scintillator panel according to claim 10, wherein the light-scattering particles include at least one type of particles selected from hollow particles having a hollow portion within the particle, multi-hollow particles having a number of hollow portions within the particle, and porous particles.

13. The scintillator panel according to claim 10, wherein the light-scattering particles include at least titanium dioxide.

14. The scintillator panel according to claim 10, wherein the support includes a resin as a main component and the reflective layer is disposed on the support.

15. The scintillator panel according to claim 14, wherein the resin is polyimide.

16. The scintillator panel according to claim 10, further comprising a light-absorbing layer on the side opposite to the surface of the reflective layer on which the scintillator layer is disposed.

17. The scintillator panel according to claim 10, wherein the scintillator layer has a columnar crystal structure formed by depositing raw materials including cesium iodide and one or more activators including at least thallium.

18. The scintillator panel according to claim 10, wherein the surface of the scintillator layer is covered with a protective film.

19. The scintillator panel according to claim 18, wherein the protective film is a polyparaxylylene film.

20. The scintillator panel according to claim 10, wherein the scintillator layer includes columnar crystals grown from an interface between the reflective layer and the scintillator layer.

21. The scintillator panel according to claim 10, wherein the scintillator panel is supported on a support plate having higher rigidity than the deposition substrate.

22. A scintillator panel manufacturing method comprising forming a reflective layer including a binder resin on a support, and forming a scintillator layer on the reflective layer by deposition, wherein the heights of columnar crystals forming the scintillator layer are aligned by applying a pressure of 1,000 to 10,000,000 Pa to the surface of the scintillator panel at a temperature not less than the glass transition temperature of the binder resin.

23. The scintillator panel manufacturing method according to claim 22, wherein the glass transition temperature of the binder resin is −100 to 60° C. and the thickness of the reflective layer is 5 to 300 μm.

* * * * *